(12) United States Patent  (10) Patent No.: US 8,167,973 B2
Viswanathan  (45) Date of Patent: May 1, 2012

(54) MICROWAVE-ASSISTED SYNTHESIS OF CARBON AND CARBON-METAL COMPOSITES FROM LIGNIN, TANNIN AND ASPHALT DERIVATIVES

(75) Inventor: Tito Viswanathan, Little Rock, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 447 days.

(21) Appl. No.: 12/487,174

(22) Filed: Jun. 18, 2009

(65) Prior Publication Data

US 2010/0032849 A1  Feb. 11, 2010

Related U.S. Application Data

(60) Provisional application No. 61/132,380, filed on Jun. 18, 2008.

(51) Int. Cl.
*B22F 9/20* (2006.01)

(52) U.S. Cl. .............. 75/345; 75/351; 75/362; 977/773; 977/788

(58) Field of Classification Search .................... 75/345, 75/351, 362; 977/773, 788
See application file for complete search history.

(56) References Cited

U.S. PATENT DOCUMENTS

| | | | |
|---|---|---|---|
| 5,972,537 | A | 10/1999 | Mao et al. |
| 6,099,990 | A | 8/2000 | Denton, III et al. |
| 6,486,008 | B1 | 11/2002 | Lee |
| 6,764,617 | B1 | 7/2004 | Viswanathan et al. |
| 7,220,484 | B2 | 5/2007 | Ton-that et al. |
| 7,358,325 | B2 | 4/2008 | Hayes |
| 2005/0186344 | A1 | 8/2005 | Takagi et al. |
| 2007/0264574 | A1 | 11/2007 | Kim et al. |
| 2007/0266825 | A1 | 11/2007 | Ripley et al. |

FOREIGN PATENT DOCUMENTS

| | | |
|---|---|---|
| CN | 1911792 A | 2/2007 |
| CN | 101402057 A | 4/2009 |

OTHER PUBLICATIONS

Wei Liu et al., A Novel Carbothermal Method for the Preparation of Nano-sized WC on High Surface Area Carbon, Chemistry Letters, 2006, 1148-1149, vol. 35, No. 10, The Chemical Society of Japan, Tsukuba, Japan.

Marina Sofos et al., A synergistic assembly of nanoscale lamellar photoconductor hybrids, Nature Materials, 2009, 68-75, vol. 8, Nature Publishing Group.

*Primary Examiner* — George Wyszomierski
*Assistant Examiner* — Tima M McGuthry Banks
(74) *Attorney, Agent, or Firm* — Morris, Manning & Martin, LLP; Tim Tingkang Xia, Esq.

(57) ABSTRACT

A process for synthesizing carbon-metal nanocomposites. In one embodiment, the process includes the steps of preparing a metal derivative or a metal chelated derivative of a carbon-containing precursor in solid form, and subjecting the metal derivative or metal chelated derivative of a carbon-containing precursor in solid form to microwave radiation at a frequency in the range of 900 MHz to 5.8 GHz, for a period of time effective to generate a heat flow from inside of the metal derivative or metal chelated derivative of a carbon-containing precursor in solid form to the outside such that the temperature of the metal derivative or metal chelated derivative of a carbon-containing precursor in solid form reaches 1,000° C. in less than 6 minutes with a temperature (T) derivative over time (t), $\Delta T/\Delta t$, no less than 2.5° C./second to form carbon-metal nanocomposites.

28 Claims, 22 Drawing Sheets

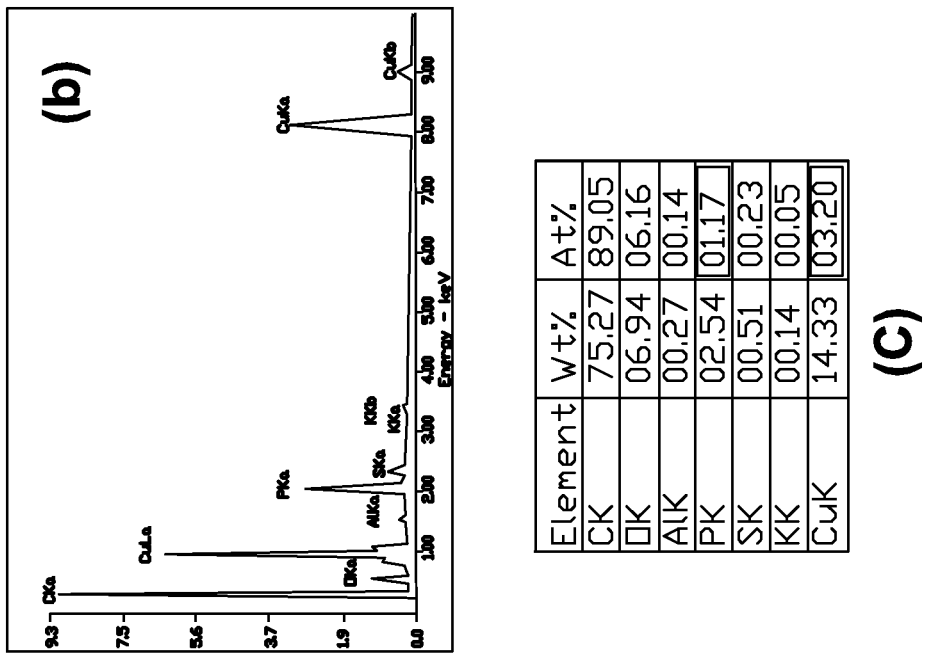
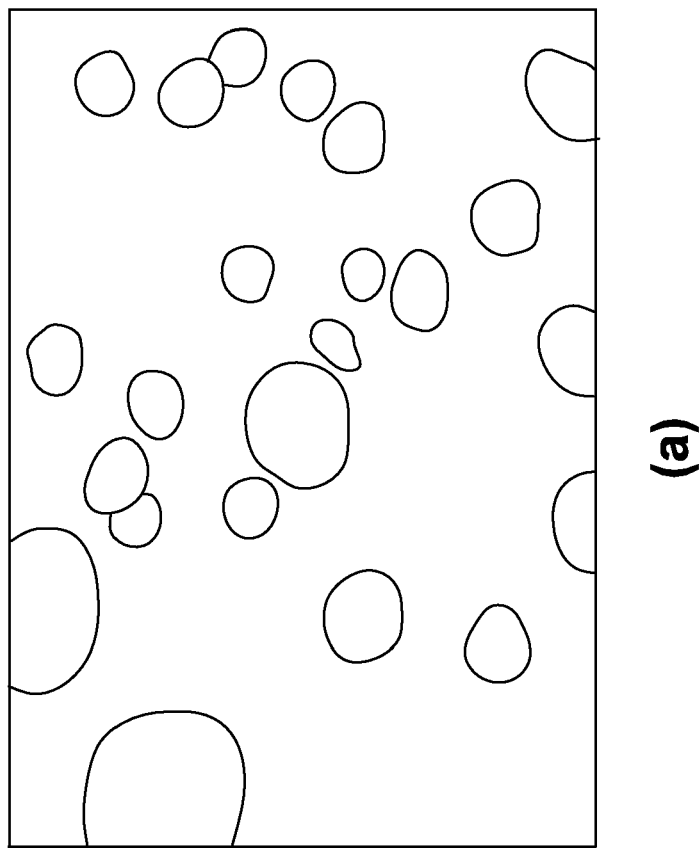
FIG. 5

MICROWAVE-ASSISTED SYNTHESIS OF CARBON AND CARBON-METAL COMPOSITES FROM LIGNIN, TANNIN AND ASPHALT DERIVATIVES

CROSS-REFERENCE TO RELATED PATENT APPLICATION

This application claims priority to and the benefit of, pursuant to 35 U.S.C. §119(e), U.S. provisional patent application Ser. No. 61/132,380, filed Jun. 18, 2008, entitled "MICROWAVE-ASSISTED SYNTHESIS OF CARBON AND CARBON-METAL COMPOSITES FROM LIGNIN, TANNIN AND ASPHALT DERIVATIVES," by Tito Viswanathan, the content of which is incorporated herein in its entirety by reference.

STATEMENT OF FEDERALLY-SPONSORED RESEARCH

This invention was made with Government support under the terms of NSF-EPSCOR funded SURF grant No. O8-EPSC0R-009-REU and DOE grant No. DEFC 36-06G086072. The Government has certain rights in the invention.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, superscript "n" represents the nth reference cited in the reference list. For example, superscript "13" represents the 13th reference cited in the reference list, namely, Liu, Shuling; Liu, Xinzheng; Xu, Liqiang; Qian, Yitai; Ma, Xicheng, Controlled synthesis and characterization of nickel phosphide nanocrystal, Journal of Crystal Growth (2007), 304(2), 430-434.

FIELD OF THE INVENTION

The present invention relates generally to a method or process of synthesizing carbon and carbon-metal composites, and more particularly to a microwave-assisted method or process of synthesizing carbon and carbon-metal composites from carbon-containing precursors, such as lignins, tannins, lignosulfonates, tanninsulfonates, and their derivatives, and applications of same.

BACKGROUND OF THE INVENTION

Plants represent an enormous source of biomass, predominantly consisting of lignin and cellulose, and rank on top in terms of the volume of renewable resource materials found in nature. Wood comprises of about 20% lignin, and is separated from cellulose by different methods including sulfite pulping, Kraft and organosolv method. The cellulose produced is mainly used in paper manufacturing but leaves behind an enormous quantity of lignin by-product. It is estimated that less than 2% of the lignin produced in the world is used.[1] The main uses for lignin are in the area of dispersants, adhesives and surfactants.

Lignin has a complex structure that superficially resembles phenol-formaldehyde resin. There are three different types of lignin monomeric units, namely, guaiacyl (significant in soft wood), syringyl and sinepyl alcohol all of which contain a phenylpropenoid unit in their structure. FIG. 1 shows the structure of the three different types of alcohols/phenols, namely, (a) guaiacyl, (b) syringyl and (c) sinapyl alcohol in lignin, respectively.

The structures shown in FIG. 1 indicate that lignin is a significant source of aromatics and could in theory and in practice compete with petroleum as an aromatic hydrocarbon resource. Extensive research on lignin utilization has been carried out over several decades but has taken on even more importance with the prospect of dwindling petroleum resources.

One of the areas where lignin has been explored is in the area of carbon fibers. Currently carbon fiber feedstocks are derived from polyacrylonitrile, pitch and rayon. However lower costs are required for penetration in high volume applications such as their use as carbon composites in high strength and light weight transport vehicles.

Carbon fibers may be made by treating lignin fibers at 1000° to 2000° C. while maintaining a fibrous structure during a stabilization stage in which the fibers are heated under tension at 200°-300° C. in presence of air. Low cost carbon fibers from lignin have been shown to be feasible by researchers at Oakridge National Laboratory, Oak Ridge, Tenn.[2]

Activated carbon fibers and metal composites have been prepared from lignin by an acid treatment and fiber formation using extrusion or melt spinning techniques, followed by progressive heating to 400° C. (<500° C.).[3] In a related research flash carbonization of biomass by controlled ignition at elevated pressures within a packed bed has been achieved by researchers at the Hawaii Natural Energy Institute.[4] Multi-walled carbon nanotubes (MWCNTs) have been obtained from grass by heating in presence of oxygen. Rapid heat treatment at ~600° C. in presence of oxygen converts the vascular bundles into CNTs. The procedure is tedious considering numerous heating and cooling cycles have to be performed for CNT formation.[5] Nanocarbons with controlled morphology have been prepared by microwave heating of conducting polymers. It was found that doped-polypyrrole, -polythiophene and -poly(ethylenedioxythiophene) (PEDOT) can be carbonized by simple microwave heating.[6]

Carbon-metal nanocomposites represent a new class of materials with niche applications in a variety of areas including electromagnetic interference (EMI) and radar shielding, fuel cells, capacitors, catalysts and solar cells. Nickel nanotubes encapsulated in CNTs have been obtained via the pyrolysis of ethylene on an array of nickel nanotubes. The procedure calls for the use of ethylene gas at 650° C. heated by conventional means.[7] Synthesis of carbon-supported Pt nanoparticles for fuel cell application have been accomplished by microwave treatment of $H_2PtCl_6$ in presence of carbon black.[8] Cu-doped carbon composites may be used as electrode materials for electrochemical capacitors. The composite was prepared by combining a phenolic resin, ferrocene, hexamethylenetetramine, and $Cu(CH_3COO)_2 2H_2O$ and heated at 800° C. in nitrogen atmosphere and activated in steam at 800° C. for different time periods.[9]

One of the applications that have attracted a lot of attention recently is in the petroleum industry. The hydroprocessing of crude oil containing S and N is of paramount importance to the gas and oil industry. This will play an ever increasing importance in the future due to declining quality of oil produced as well as stricter laws mandating reduced level in gasoline and diesel. In view of keeping up with the imposed restrictions it is imperative that improved catalysts for accomplishing these goals be investigated. Researchers have shown that transition metal phosphides are very active catalysts in hydroprocessing.[15,16] Among these catalysts Nickel phosphide, $Ni_2P$ on silica support has been shown to exhibit excellent performance characteristics in both hydrodenitrogenation (HDN) as well as hydrodesulfurization (HDS) with activities greater than commercially available mixed transition metal Ni—Mo—$S/Al_2O_3$ catalyst.[11]

The discovery of $Ni_2P$ as an outstanding catalyst for both HDN and HDS has attracted interest in the synthesis of nickel phosphides.[12] A comparison of the different synthetic procedures for transition metal phosphide synthesis, indicates that most are tedious that use highly reactive and expensive precursors, use electrolytic reduction or $H_2$ gas for the transformation. Prior techniques have included the combination of the elements under extreme temperature and pressure, reaction of metal chloride with phosphine gas, decomposition of complex organometallics, electrolysis and reduction of phosphate with gaseous hydrogen.[10] These techniques are neither economically attractive nor quick or safe, for large scale commercial manufacture in an industrial setting.

A method for controlled synthesis of $Ni_2P$ nanocrystals has been reported recently by Liu et al.[13] The procedure involves reacting yellow phosphorous and $Ni_2SO_4$ in ethylene glycol: water solvent in an autoclave at 180° C. for 12 hours. The black solid product is filtered and washed with absolute ethanol, benzene and water. The XRD of the product showed that it was $Ni_2P$ and the morphology was dendritic as determined by SEM. The mechanism of the formation of the product was thought to involve the formation of $PH_3$ upon the reaction of P with water and with $H_3PO_4$. Once generated nickel ions were theorized to combine with $PH_3$ to form $Ni_2P$.

Xie et. al[14] have reported the synthesis of irregular Nickel phosphide nanocrystals containing Ni, $Ni_3P$, $Ni_5P_2$ and $Ni_{12}P_5$ by a milder route using $NiCl_2$ and sodium hypophosphite as reactants at 190° C. The product after reflux was washed with ammonia and ethanol. Copper phosphide hollow spheres have been synthesized in ethylene glycol by a solvothermal process using copper hydroxide and elemental phosphorus as starting material using an autoclave at 200° C. for 15 hours.[15]

Therefore, a heretofore unaddressed need exists in the art to address the aforementioned deficiencies and inadequacies.

SUMMARY OF THE INVENTION

The present invention, in one aspect, relates to a process for synthesizing carbon-metal nanocomposites. In one embodiment, the process includes the steps of preparing a metal derivative or a metal chelated derivative of a carbon-containing precursor in solid form, and subjecting the metal derivative or metal chelated derivative of a carbon-containing precursor in solid form to microwave radiation at a frequency in the range of 900 MHz to 5.8 GHz, for a period of time effective to generate a heat flow from inside of the metal derivative or metal chelated derivative of a carbon-containing precursor in solid form to the outside such that the temperature of the metal derivative or metal chelated derivative of a carbon-containing precursor in solid form reaches 1,000° C. in less than 6 minutes with a temperature (T) derivative over time (t), $\Delta T/\Delta t$, no less than 2.5° C./second to form carbon-metal nanocomposites.

In one embodiment, the frequency of microwave radiation is preferably at around 2.45 GHz, and the period of time effective is in a range of 30 seconds to 60 minutes, more preferably between 4 minutes and 30 minutes.

The metal of the metal derivative or metal chelated derivative is selected from the group consisting of Sb, Li, Rb, Ti, V, Mn, Fe, Co, Ni, Cu, Zn, Zr, Mo, Ru, Rh, Pd, Ag, W, Ir, Pt, Au and a combination thereof.

The process, in one embodiment, further has the step of performing an alkali treatment to the metal derivative or metal chelated derivative of a carbon-containing precursor prior to the subjecting step, wherein the metal in the metal derivative or metal chelated derivative is one of Co, Cu, Mn, Ni, Fe, W, Zr and Ti.

The carbon-containing precursor is selected from the group consisting of lignin, lignosulfonate, tannin, tanninsulfonate and sulfonated asphalt.

In one embodiment, the subjecting step is performed in the presence of a microwave absorber.

The microwave absorber is selected from the group consisting of metal particles, phosphoric acid, hydrated $NaH_2PO_4$, $Co_2O_3$, CuO, $MnO_2$, NiO, $Fe_3O_4$, $WO_3$, $Ag_2O$, $Au_2O_3$, non-stoichiometric oxides of titanium ($TiO_{2-x}$) and a carbon allotrope, wherein the carbon allotrope is selected from the group consisting of carbon black, fullerene, graphite and carbon nanotubes.

The present invention, in one aspect, also relates to carbon-metal nanocomposites made according to the process set forth above.

The present invention, in another aspect, relates to a process for synthesizing carbon-metal nanocomposites. In one embodiment, the process includes the steps of preparing an ammonium salt of a carbon-containing precursor and a metal salt in solid form, and subjecting the ammonium salt of a carbon-containing precursor and the metal salt in solid form to microwave radiation at a frequency in the range of 900 MHz to 5.8 GHz, for a period of time effective to generate a heat flow from inside of the ammonium salt of a carbon-containing precursor and the metal salt in solid form to the outside such that the temperature of the ammonium salt of a carbon-containing precursor and the metal salt in solid form reaches 1,000° C. in about less than 6 minutes with a temperature (T) derivative over time (t), $\Delta T/\Delta t$, no less than 2.5° C./second to form carbon-metal nanocomposites.

In one embodiment, the frequency of microwave radiation is preferably at around 2.45 GHz, and the period of time effective is in a range of 30 seconds to 60 minutes, more preferably between 4 minutes and 30 minutes.

The metal of the metal salt is selected from the group consisting of Sb, Li, Rb, Ti, V, Mn, Fe, Co, Ni, Cu, Zn, Zr, Mo, Ru, Rh, Pd, Ag, W, Ir, Pt, Au and a combination thereof.

The metal salt is selected from the group consisting of an oxalate, an acetate, a sulfate and a chloride.

The carbon-containing precursor is selected from the group consisting of ammonium lignosulfonate, ammonium tanninsulfonate and ammonium asphaltsulfonate.

In one embodiment, the subjecting step is performed in the presence of a microwave absorber. The microwave absorber is selected from the group consisting of metal particles, phosphoric acid, hydrated $NaH_2PO_4$, $Co_2O_3$, CuO, $MnO_2$, NiO, $Fe_3O_4$, $WO_3$, $Ag_2O$, $Au_2O_3$, non-stoichiometric oxides of titanium ($TiO_{2-x}$) and a carbon allotrope, wherein the carbon allotrope is selected from the group consisting of carbon black, fullerene, graphite and carbon nanotubes.

The present invention, in one aspect, also relates to carbon-metal nanocomposites made according to the process set forth above.

The present invention, in another aspect, relates to a process for synthesizing carbon-metal nanocomposites. In one embodiment, the process includes the steps of preparing a carbon-containing precursor, and subjecting the carbon-containing precursor in the presence of a microwave absorber to microwave radiation at a frequency in the range of 900 MHz to 5.8 GHz, for a period of time effective to generate a heat flow from inside of the carbon-containing precursor to the outside such that the temperature of the carbon-containing precursor increases with a temperature (T) derivative over time (t), $\Delta T/\Delta t$, no less than 2.5° C./second to form carbon-metal nanocomposites.

In one embodiment, the frequency of microwave radiation is preferably at around 2.45 GHz, and the period of time effective is in a range of 30 seconds to 60 minutes, more preferably between 4 minutes and 30 minutes.

The microwave absorber is selected from the group consisting of metal particles, phosphoric acid, hydrated $NaH_2PO_4$, $Co_2O_3$, $CuO$, $MnO_2$, $NiO$, $Fe_3O_4$, $WO_3$, $Ag_2O$, $Au_2O_3$, non-stoichiometric oxides of titanium ($TiO_{2-x}$) and a carbon allotrope, wherein the carbon allotrope is selected from the group consisting of carbon black, fullerene, graphite and carbon nanotubes.

The carbon-containing precursor is selected from the group consisting of lignin, an ammonium derivative of lignin, an alkali metal lignosulfonate, tannin, tanninsulfonate, asphalt, sulfonated asphalt, wood, sawdust, sucrose, lactose, cellulose, starch, polysaccharide, organic garbage, pitch derived from petroleum or coal, a carbon-containing polymer and their derivatives.

The carbon-containing polymer is selected from the group consisting of polyethylene glycol, polybenzimidazole, polybutadiene, polyethylene, polyvinyl alcohol, polyimides, polystyrene, rayon, polypropylene, nylon, phenol-formaldehyde resin and naphthalenesulfonic acid-formaldehyde copolymer.

In one embodiment, the carbon-containing precursor further comprises a dispersion of a metal salt, wherein the metal of the metal salt is selected from the group consisting of Sb, Li, Rb, Ti, V, Mn, Fe, Co, Ni, Cu, Zn, Zr, Mo, Ru, Rh, Pd, Ag, W, Ir, Pt, Au and a combination thereof.

In one embodiment, the process further includes the step of performing an alkali treatment to the metal salt prior to the subjecting step.

The present invention, in one aspect, also relates to carbon-metal nanocomposites made according to the process set forth above.

The present invention, in yet another aspect, relates to a process for synthesizing carbon-metal nanocomposites. In one embodiment, the process includes the steps of preparing a sample of metal ions and an organic compound, and subjecting the sample to microwave radiation at a frequency in the range of 900 MHz to 5.8 GHz, for a period of time effective to generate a heat flow from inside of the sample to the outside such that the temperature of the sample increases with a temperature (T) derivative over time (t), $\Delta T/\Delta t$, no less than 2.5° C./second for at least several minutes to form carbon-metal nanocomposites.

In one embodiment, the frequency of microwave radiation is preferably at around 2.45 GHz, and the period of time effective is in a range of 30 seconds to 60 minutes, more preferably between 4 minutes and 30 minutes.

The organic compound comprises one of cellulose, hydroxyalkylcellulose, cyclodextrins, chitin, chitosan, starch; guar gum and polysaccharides, wherein the hydroxyalkylcellulose comprises hydoxyethylcellulose, methylcellulose, and carboxymethylcellulose.

The metal ions comprises at least one of metals in Groups III, IV, V, VI, VII, VIII, IB, IIB, IIIA of the Periodic Table.

The present invention, in one aspect, also relates to carbon-metal nanocomposites made according to the process set forth above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

FIG. 5 shows (a) SEM, (b) EDX and (c) corresponding data for copper phosphide prepared according to one embodiment of the present invention, respectively.

DETAILED DESCRIPTION OF THE INVENTION

Figure 1:
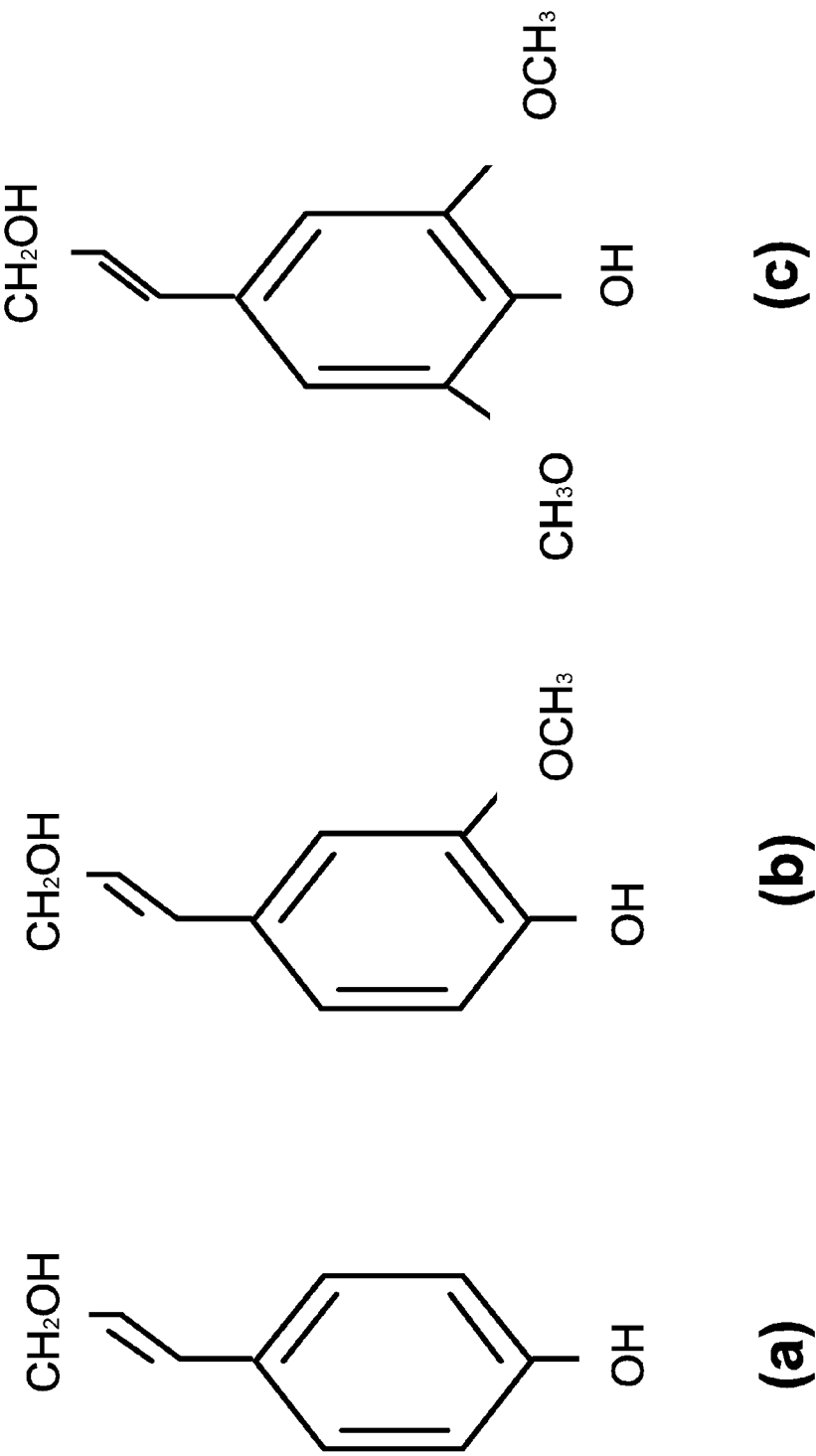
FIG. 1 shows structures of (a) guaiacyl, (b) syringyl and (c) sinapyl alcohol in lignin.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

DEFINITIONS

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "scanning electron microscope (SEM)" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, the term "X-ray diffraction (XRD)" refers to one of X-ray scattering techniques that are a family of non-destructive analytical techniques which reveal information about the crystallographic structure, chemical composition, and physical properties of materials and thin films. These techniques are based on observing the scattered intensity of an X-ray beam hitting a sample as a function of incident and scattered angle, polarization, and wavelength or energy. In particular, X-ray diffraction finds the geometry or shape of a molecule, compound, or material using X-rays. X-ray diffraction techniques are based on the elastic scattering of X-rays from structures that have long range order. The most comprehensive description of scattering from crystals is given by the dynamical theory of diffraction.

As used herein, "nanoscopic-scale," "nanoscopic," "nanometer-scale," "nanoscale," the "nano-" prefix, and the like generally refers to elements or articles having widths or diameters of less than about 1 µm, preferably less than about 100 nm in some cases. In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, "plurality" means two or more.

As used herein, the terms "comprising," "including," "carrying," "having," "containing," "involving," and the like are to be understood to be open-ended, i.e., to mean including but not limited to.

OVERVIEW OF THE INVENTION

The present invention, in one aspect, relates to a novel method or process for the conversion of biomass renewable resources materials into carbon and carbon-metal nanostructures. The method is an environmentally friendly process that may revolutionize carbon black and related industries by making use of massive quantities of by-products from the forest product industries and steer away from non-renewable resources such as natural gas, petroleum, and coal for the generation of carbon materials. In one embodiment, the process also allows the synthesis of carbon-metal nanocomposites, where the metal is either in the elemental state or is a tetralide, pnictide or chalcogenide, for example a carbide, nitride or an oxide. The materials synthesized according to various embodiments of the present invention represent technologically diverse multifunctional materials by an extremely inexpensive and environmentally friendly process. The novel nanometal derivatives synthesized according to various embodiments of the present invention represent an entirely new line of nanocomposites with unique morphologies with potential applications in a variety of fields some of which may be hitherto unknown.

The process according to various embodiments of the present invention will also allow the formation of carbides, nitrides and borides, which represent exciting new materials. Among many applications of one of the carbon-metal composites, $Ni_2P$ (Nickel phosphide) synthesized according to various embodiments of the present invention, one is its use as a catalyst for the removal of sulfur and nitrogen from petroleum feedstocks—a problem of extreme urgency because of the prediction of decreased Arab oil resources and increased reliance on Canadian tar sands with increased Sulfur and Nitrogen content.

The process according to various embodiments of the present invention is quick and inexpensive in comparison to the known technologies. Moreover, it represents a deviation from conventional heating source as well as raw materials, many of which are non-renewable resource based. It also allows the formation of metal nanoparticles either pristine or on carbon support with high surface area. Additionally, the process simultaneously reduces metal ions during the process of carbonization and produces nanoparticles of both carbon and metal. The metal obtained may be a zero valent metal or one of the metal tertralides, pnictides, chalcogenides, borides or carbides depending on the reactants present during the synthetic process. The process also allows the formation of unique carbon nanostructures including nanodiamonds.

The present invention, in another aspect, relates to a novel method or process for synthesizing carbon-metal composites using metal ions in presence of an organic compound, which is one of cellulose; hydroxyalkylcellulose such as hydoxyethylcellulose, methylcellulose, carboxymethylcellulose; cyclodextrins; chitin and chitosan; starch; guar gum and polysaccharides.

The present invention, in yet another aspect, relates to a novel method or process for synthesizing metal particles in the reducing or non-oxidizing environment generated during the microwave process without the need to use reducing gases, such as $H_2$ gas, or inert gases, such as Ar and $N_2$ gases, during the process, where the process in one embodiment allows simultaneously producing carbon from lignin and reducing the metal ions, such as Ni, Cu, to elemental metal such that nanoparticles of carbon and metal are produced after dispersion.

The present invention, in a further aspect, relates to a novel method or process for synthesizing $Ni_2P$ nanoparticles in the reducing or non-oxidizing environment generated during the microwave process without the need to use reducing gases, such as $H_2$ gas, during the process.

The present invention, in another aspect, relates to a novel method or process for synthesizing $Cu_3P$ and $Cu_2S$ nanoparticles in the reducing or non-oxidizing environment generated during the microwave process without the need to use reducing gases, such as $H_2$ gas, during the process.

The present invention, in yet another aspect, relates to a process for the preparation of carbon nanostructures as well as carbon-metal nanostructures by applying microwave radiation to a carbon-containing precursor, such as lignins, tannins, lignosulfonates, tanninsulfonates and their derivatives. The microwave radiation is applied at a frequency of 900 MHz to 5.8 GHz, or more preferably at a frequency of 2.45 GHz for a period of 30 seconds to 60 minutes, or more preferably for a period between 4 minutes and 30 minutes. The process may take place either in the presence of air, in the presence of a non-oxygenated atmosphere or in the absence of air.

In one embodiment, the precursor is a metal derivative or a metal chelated derivative of a carbon-containing material and the end result is a carbon-metal composite. The metal may be Sb, Li, Rb, Ti, V, Mn, Fe, Co, Ni, Cu, Zn, Zr, Mo, Ru, Rh, Pd, Ag, W, Ir, Pt, Au or a mixture of any of the preceding. The carbon-containing precursor may be lignin, lignosulfonate, tannin, tanninsulfonate or sulfonated asphalt. In an alternative embodiment, the metal derivative or metal chelated derivative may have undergone alkali treatment to convert the metal to a metal oxide. In this alternative, the metal is preferably Co, Cu, Mn, Ni, Fe or W. In either alternative, the process may be assisted by the presence of a microwave absorber. The microwave absorber may include metal particles, phosphoric acid, hydrated $NaH_2PO_4$, $Co_2O_3$, CuO, $MnO_2$, NiO, $Fe_3O_4$, $WO_3$, $Ag_2O$, $Au_2O_3$, a non-stoichiometric oxide of titanium ($TiO_{2-x}$) or a carbon allotrope, such as carbon black, fullerene, graphite and carbon nanotubes.

In another embodiment, the precursor is an ammonium salt of a carbon-containing material and the process is carried out in the presence of a metal salt, either with or without the presence of a microwave absorber. The metal of the metal salt may include Sb, Li, Rb, Ti, V, Mn, Fe, Co, Ni, Cu, Zn, Zr, Mo, Ru, Rh, Pd, Ag, W, Ir, Pt, Au or and mixtures of any of the preceding. The metal salt may be an oxalate, an acetate, a sulfate or a chloride. The precursor may be ammonium lignosulfonate, ammonium tanninsulfonate and ammonium asphaltsulfonate. As in the embodiments described above, the microwave absorber may include metal particles, phosphoric acid, hydrated $NaH_2PO_4$, $Co_2O_3$, CuO, $MnO_2$, NiO, $Fe_3O_4$, $WO_3$, $Ag_2O$, $Au_2O_3$, a non-stoichiometric oxide of titanium ($TiO_{2-x}$) or a carbon allotrope, such as carbon black, fullerene, graphite and carbon nanotubes.

In a further embodiment, the precursor is a carbon-containing material dispersed with a metal salt. Alternatively, the metal salt may have undergone alkali treatment. In either alternative, the process may be assisted by the presence of a microwave absorber. The metal of the metal salt may be Sb, Li, Rb, Ti, V, Mn, Fe, Co, Ni, Cu, Zn, Zr, Mo, Ru, Rh, Pd, Ag, W, Ir, Pt, Au or a mixture of any of the preceding. The precursor may be sucrose, lactose, starch, polysaccharide, phenol-formaldehyde resin, naphthalenesulfonic acid-formaldehyde copolymer, polyvinyl alcohol, asphaltsulfonate, lignin, lignosulfonate, tannin or tanninsulfonate. The microwave absorber may include metal particles, phosphoric acid, hydrated $NaH_2PO_4$, $Co_2O_3$, CuO, $MnO_2$, NiO, $Fe_3O_4$, $WO_3$, $Ag_2O$, $Au_2O_3$, a non-stoichiometric oxide of titanium ($TiO_{2-x}$) or a carbon allotrope, such as carbon black, fullerene, graphite and carbon nanotubes.

In a still further embodiment, the process may be used for making carbon particles by starting with a carbon-containing precursor, with or without a microwave absorber. The precursor may include lignin, tannin, asphalt and their derivatives. The precursor may also include an ammonium derivative of lignin, an alkali metal lignosulfonate, tanninsulfonate, sulfonated asphalt, wood, sawdust, sucrose, lactose, cellulose, starch, polysaccharide, organic garbage, pitch derived from petroleum or coal or a carbon-containing polymer, such as polybenzimidazole, polybutadiene, polyethylene, polyvinyl alcohol, polyimides, polystyrene, rayon, polypropylene, nylon, phenol-formaldehyde resin or naphthalenesulfonic acid-formaldehyde copolymer. The microwave absorber may include metal particles, phosphoric acid, hydrated $NaH_2PO_4$, $Co_2O_3$, CuO, $MnO_2$, NiO, $Fe_3O_4$, $WO_3$, $Ag_2O$, $Au_2O_3$, a non-stoichiometric oxide of titanium ($TiO_{2-x}$) or a carbon allotrope, such as carbon black, fullerene, graphite and carbon nanotubes.

In a typical preparation of carbon particles from lignin, tannin, lignosulfonate or tanninsulfonate or mixtures thereof, a one gram sample of the wood byproduct is dissolved in water, 0.25 g of powdered graphite is added and mixed thoroughly using a sonicator. The water is evaporated and the dry powder is then placed inside a microwave oven under a hood. The oven is then turned on for a duration of 4 minutes. The sample sparks momentarily and glows red during the entire process. The sample may then be optionally heated further or the reaction may be terminated. The black sample is then powdered using a mortar and pestle and then introduced in a Erlenmeyer flask. A 100 mL aliquot of deionized (DI) water is brought to boil while stirring. The solution is then cooled to room temperature and filtered through a coarse filter paper. Residue is washed with 4×100 mL of DI water and then dried on the filter paper via suction. It is then dried further in a vacuum oven at room temperature overnight.

In a typical preparation of carbon-metal nanocomposites, the lignosulfonate salt is converted to the desired metal lignosulfonate salt prior to carbonization. A 10 g sample of calcium lignosulfonate, which has 5% $Ca^{2+}$ (0.0125 mol Ca ions) is added to 70 mL of DI water and heated to 90 degrees C. with stirring. A 0.0125 mol sample of metal sulfate (copper, cobalt, nickel, iron, zinc, etc.) is then added to the solution and the reaction mixture heated for one hour at 90 degrees C. The solution is then cooled and filtered through a coarse filter paper to remove the $CaSO_4$ and the filtrate is then heated at 85 degrees C. until the water evaporates. It is then furthered dried in a vacuum oven overnight at room temperature. Typical yield is around 85-90%. (Instead of the calcium salt, sodium salts in presence of metal salts may be used a starting materials for the preparation of carbon-metal nanocomposites in which case the filtration step is not needed.)

In case of metal lignosulfonates or a metal chelated lignosulfonate, a 1 g sample is treated with 4 drops of 85% phosphoric acid and thoroughly mixed using a mortar and pestle. It is then subjected to microwave radiation using a 950 watt microwave oven placed under a hood for 2 minutes. It is then subjected to further 4 minutes of microwave treatment. The sample is cooled and introduced into a mortar and pestle and powdered. The sample is treated in boiling water for 10 minutes and cooled and filtered through suction. It is then washed with 4×100 mL of DI water and dried on the filter paper under suction. It is further dried in a vacuum oven in room temperature overnight.

In another method alkali is added to convert the metal lignosulfonate or a metal chelated derivative to a metal oxide which becomes an excellent microwave absorber. The heat generated is sufficient to carbonize the lignin and to make metal in the zero valence state by reaction with carbon.

Lignin, tannin and asphalt and their derivatives are preferred, although not the sole or reuired, materials for use in the practice of the present invention. These materials are widely available and may occur as byproducts or wastes from other industrial operations.

Lignin, the major non-cellulosic constituent of wood, is a complex phenolic polymer that bears a superficial resemblance to phenol-formaldehyde resins. It consists of functionalized phenylpropane units connected via alkyl and aryl ether linkages. Essentially, all of the lignin commercially available is isolated as by-products from the paper industry from either the sulfite or the Kraft process.

Sulfonated lignins are obtained either as spent sulfite liquor (SSL) or by sulfonation of lignin obtained from the Kraft process. SSL obtained from the sulfite process consists of lignosulfonates (approximately 55%), sugars (30%), and other ingredients in smaller amounts. A typical monomeric unit of Kraft lignin that has been sulfomethylated at the aromatic ring and sulfonated on the aliphatic side chain has the following chemical structure:

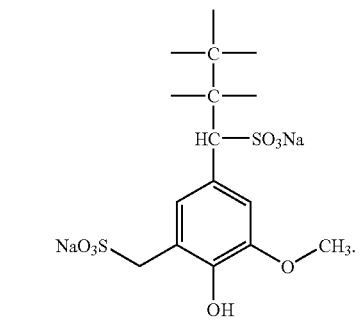

Sulfomethylation is accomplished by the reaction of the Kraft lignin with formaldehyde and sodium sulfite. The aliphatic sulfonation occurs preferentially at the benzylic position of the side chain of the phenylpropane units. Lignosulfonates are available are available as sodium salts (Reax® 825E, Kraftsperse® and Polyfon® from MeadWestvaco, for example) and are cheaper alternatives to other forms of lignosulfonates. LignoTech's calcium salt of lignosulfonic acid (Borresperse CA) is especially suitable for the synthesis of metal-carbon nanocomposites. Some of the applications of lignosulfonates are in concrete admixtures, animal feed, oil-well drilling muds, dust control, emulsion stabilizers, dye dispersants, wood preservation, and mining aids.

Metal lignosulfonates and metal chelated lignosulfonates are readily available from a variety of manufacturers. For example, iron lignosulfonate and ferrochrome lignosulfonate are extensively used in the petroleum industry. Also metal chelated lignosulfonate where the metal ion is either magnesium, copper, zinc, iron or manganese is used in the agricultural industry. These products are used as inorganic micronutrients along with fertilizers during farming. Examples of metal chelated lignosulfonates are Borrechel FE, Borrechel MN, Borrechel CU and Borrechel ZN available from LignoTech.

MeadWestvaco and LignoTech USA are two of the major manufacturers of lignosulfonates in the U.S. and a variety of sulfonated lignin products are available from them. The sulfonation can be controlled to occur either at the aromatic ring or the benzylic position or both. The degree and position of sulfonation can affect the final property and potential application of the lignin.

Tannins are naturally occurring polyphenols that are found in the vascular tissue of plants such as the leaves, bark, grasses, and flowers. They are classified into two groups: condensed tannins and hydrolysable tannins. The reaction scheme for the sulfonation of monomeric unit of a condensed tannin is illustrated below:

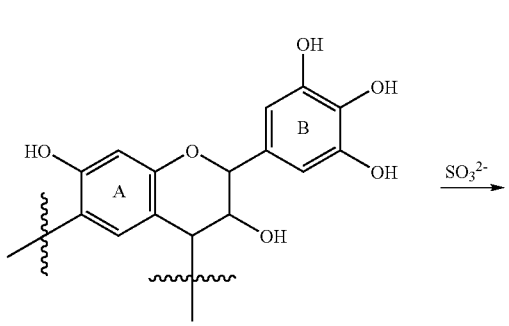

-continued

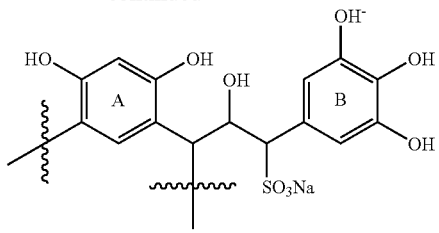

The structure consists of three rings: two benzene rings on either side of an oxygen-containing heterocyclic ring. The A-ring to the left of the cyclic ether ring consists of one or two hydroxyl groups. The B-ring present on the right of the cyclic ether ring also consists of two or three hydroxyl groups.

A particular tannin of interest is Quebracho tannin. This tannin is obtained from the hot water extraction of the heartwoods of Schinopsis balansae and lorentzii, indigenous to Argentina and Paraguay. Quebracho accounts for 30% of the dry weight of the heartwoods with a production level averaging 177,000 tons per year over the past 30 years, according to the Tannin Corporation, Peabody, Mass. Sulfonated tannins are commercially available and represent an inexpensive renewable resource. For example, Chevron Philips Chemical in The Woodlands, Tex. supplies tannins with different degrees of sulfonation. The MSDSs and technical data sheets providing the structure and percentage of sulfur in the products are also provided. Sold under the trade name of "Orfom®" tannins, these represent an alternate source of a sulfonated renewable resource that could be compared to sulfonated lignins.

Sulfonated asphalts are used extensively in the petroleum industry. They are produced by the sulfonation of asphalt which is a derived from petroleum. Suppliers of sulfonated asphalt include Chevron Phillips in the USA and Flowline Solutions in Calgary, Canada.

Calcium lignosulfonate was converted to metal lignosulfonate by treatment with metal sulfate followed by filtration to remove $CaSO_4$. The metal lignosulfonate was then treated with aqueous NaOH to yield a lignosulfonate-metal oxide nanocomposite, which was then subjected to microwave radiation at 2.45 MHz operating at 950 W, for different time periods.

Borresperse CA (calcium lignosulfonate) was supplied by LignoTech Inc. NaOH, $CuSO_4 5H_2O$ and $NiSO_4 6H_2O$ was purchased from Aldrich.

In a typical experiment, 1 g of calcium lignosulfonate containing 0.05 g of $Ca^{2+}$ (0.00125 moles) was dissolved in 70 mL of deionized water. To this an equimolar amount of metal sulfate was added and the solution heated to 90° C. for one hour. The solution was then cooled to room temperature and the $CaSO_4$ formed was filtered through a coarse filter paper using vacuum suction.

A 3 mL aliquot of 6M NaOH was added to the filtrate and the solution was heated with agitation at 90° C. until all the water evaporated. The sample was powdered, placed in a crucible and subjected to microwave radiation at 2.45 MHz from a tabletop microwave oven operating at 950 W. Depending on the metal, after a visible red glow (approximately 5 minutes) the sample was subjected to an additional microwave exposure for 4 minutes. All experiments were carried out in ambient atmosphere. After termination of the microwave radiation the sample was scraped from the crucible, powdered and washed with excess water. Filtration followed by drying produced a black powder in approximately 25% yield (from calcium lignosulfonate).

The mechanism by which the transformation occurs probably involves the conversion of metal ions into metal oxide by the action of base. The excellent microwave absorption by the metal oxide results in a "thermal runaway" phenomenon resulting in high temperature carbonization of the lignin, eliminating some oxides of carbon during the transformation with concomitant reduction of the metal oxide to metal. It is further noted that in comparison with existing technologies, where conventional heating generates a heat flow from "outside" of the sample towards "inside" to the sample, the microwave heating of metal oxides generates a heat flow from "inside" of the sample towards to the "outside" of the sample, which results in a more uniformly, efficient, effective and rapid heating pattern.

These and other aspects of the present invention are further described below.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

Example 1

This example illustrates a method or process according to one embodiment of the present invention.

Figure 22:
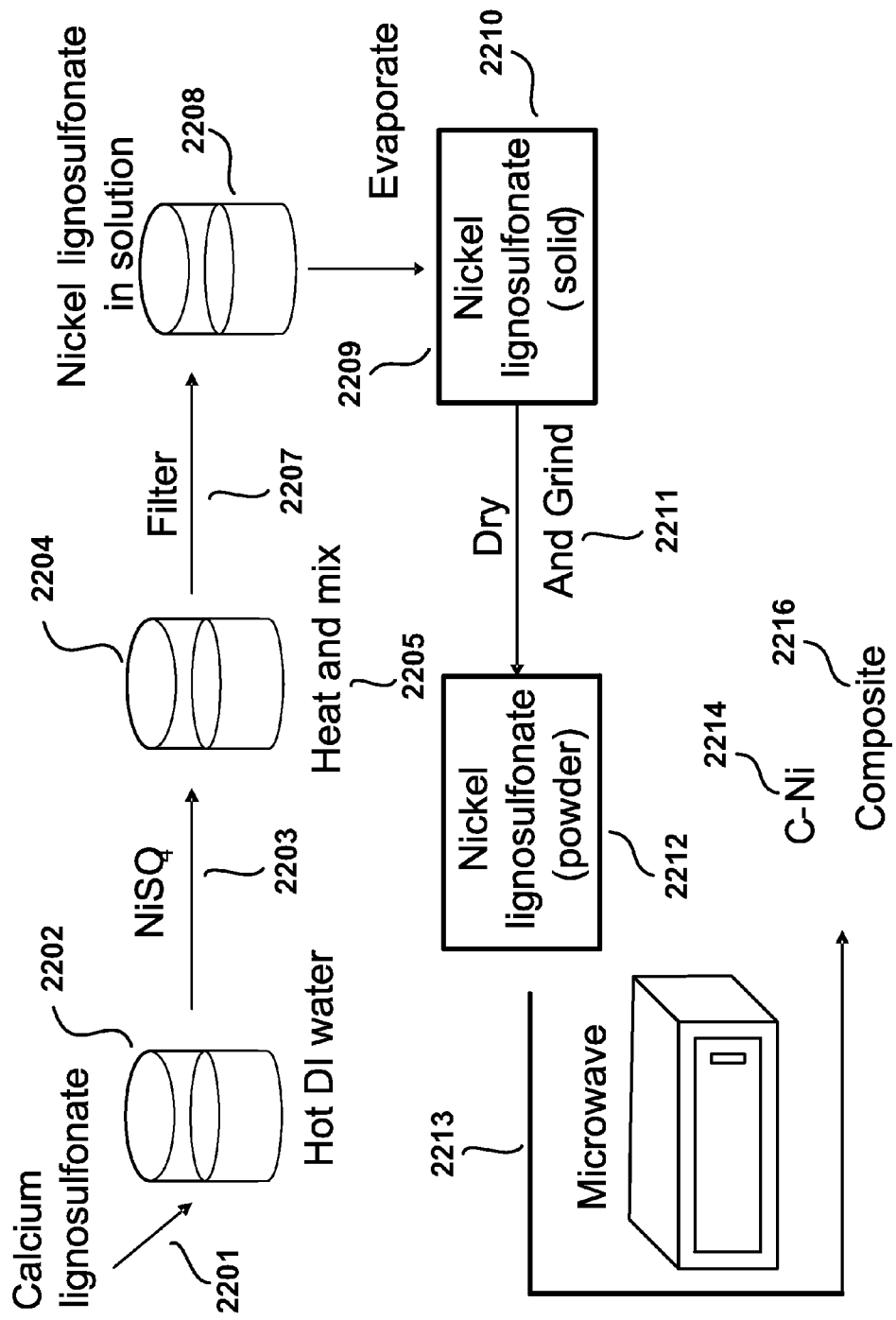
FIG. 22 shows a flow diagram illustrating a synthesis process of making Ni—C composite according to one embodiment of the present invention.

Referring now to FIG. 22, an exemplary process for synthesizing Ni—C nanocomposites is schematically shown according to one embodiment of the present invention. At first, a certain amount of lignosulfonate salt is converted to desired metal lignosulfonate salt prior to carbonization. At step 2201, a 10 g sample of calcium lignosulfonate, which has 5% $Ca^{2+}$ (0.0125 mol Ca ions), is added to 70 mL of DI water in a container to form a solution. At step 2202, the solution is heated to a temperature range of about 85-90 degrees C. with stirring. At step 2203, a 0.0125 mol sample of nickel sulfate, $NiSO_4$, is then added to the solution to form a reaction mixture. Note that in other embodiments, depending on what metal carbon nanoparticles is desired, other metal salts with metals such as Sb, Li, Rb, Ti, V, Mn, Fe, Co, Cu, Zn, Zr, Mo, Ru, Rh, Pd, Ag, W, Ir, Pt, Au or any mixture of them, can also be utilized.

At step 2204, the reaction mixture is mixed well. And at step 2205, the reaction mixture is heated for at a temperature at about 90° C. for a period of time effective to allow the following chemical reaction to take place:

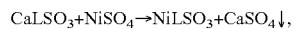

where in this embodiment the period of time effective is about one hour, which may be different if other metal salts are used.

At step 2207, the resultant solution is then cooled and filtered through a coarse filter paper using vacuum suction to remove the $CaSO_4$ to result in a filtrate having nickel lignosulfonate in solution, namely $NiLSO_3+H_2O$, at step 2208. The Then, at step 2209, the filtrate is heated at 85 degrees C. until the water evaporates, which results in nickel lignosulfonate (i.e., NiLSO₃) in solid form at step 2210. Optionally, at step 2209, a 3 mL aliquot of 6M NaOH can be added to the filtrate and the solution was heated with agitation at 90° C. until all the water evaporated.

At step 2211, the NiLSO₃ in solid form is then furthered dried in a vacuum oven overnight at room temperature. Typical yield is around 85-90%. Note that in other embodiments, instead of the calcium salt, sodium salts in presence of metal salts may be used a starting materials for the preparation of carbon-metal nanocomposites in which case the filtration step, step 2207, is not needed.

At step 2212, the dried NiLSO₃ in solid form is powdered. And at step 2213, the powdered NiLSO₃ sample is placed in a crucible and subjected to microwave radiation at 2.45 MHz from a tabletop microwave oven operating at 950 W. Depending on the metal, after a visible red glow (approximately 5 minutes) the sample was subjected to an additional microwave exposure for 4 minutes. All experiments were carried out in ambient atmosphere. After termination of the microwave radiation the sample was scraped from the crucible, powdered and washed with excess water. Filtration followed by drying produced a black powder of Carbon Nickel composites in approximately 25% yield (from calcium lignosulfonate).

Optionally, at step 2214, metals, here Ni, can be removed to produce a collection of carbon nanoparticles.

Alternatively, at step 2216, carbons can be removed to produce a collection of only metal (here Ni) nanoparticles.

Example 2

This example describes $Ni_2P$ nanoparticles that are synthesized according to one embodiment of the present invention utilizing the exemplary process set forth in EXAMPLE 1, or a process similar to it.

Figure 2:
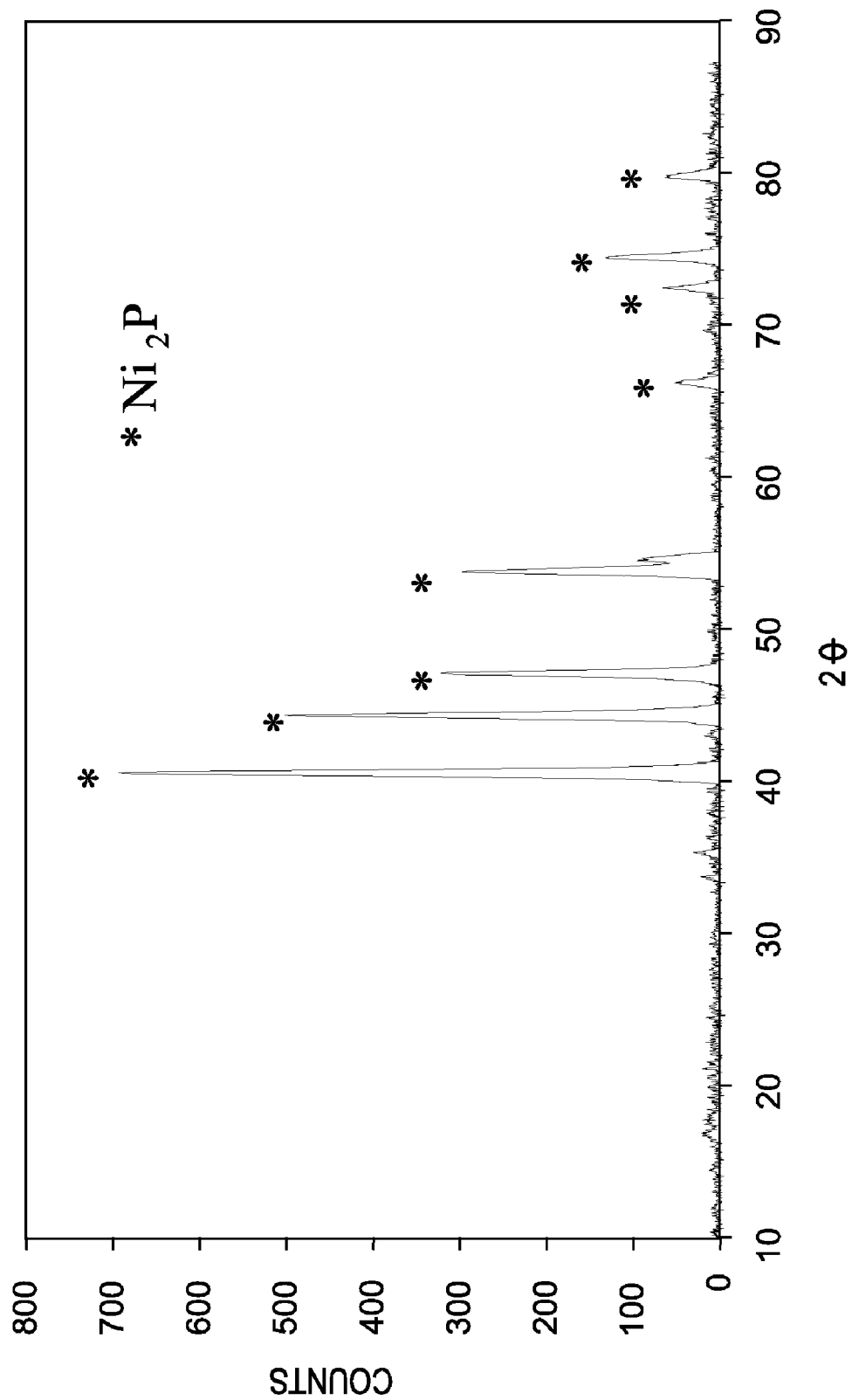
FIG. 2 shows an XRD spectrum of $Ni_2P$ generated according to one embodiment of the present invention.

An XRD of the sample prepared shown in FIG. 2 indicates that pure $Ni_2P$ is produced. There is an exact match with $Ni_2P$ standard file with no other impurities.

Figure 3:
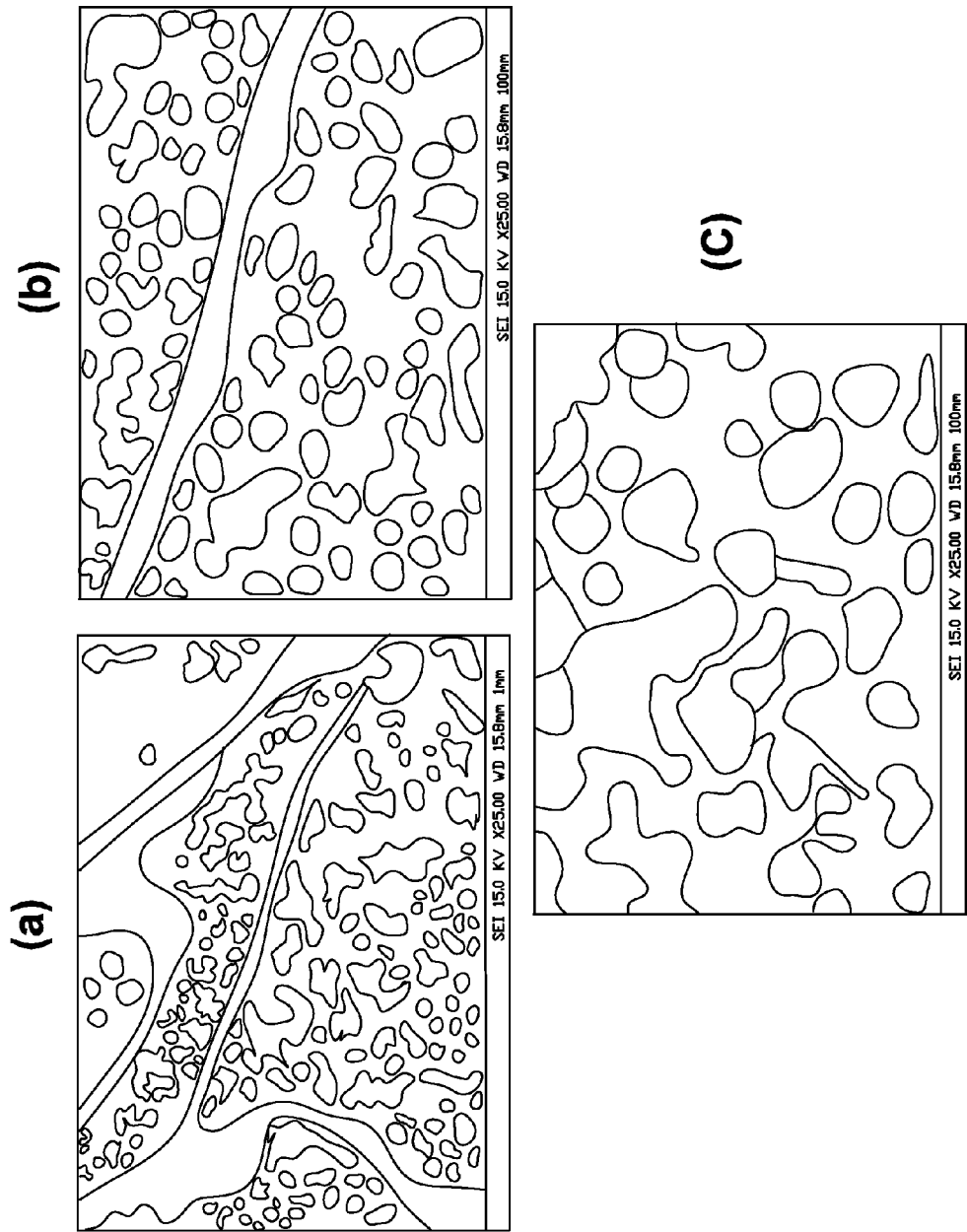
FIG. 3 shows an image of an SEM of $Ni_2P$ synthesized according to one embodiment of the present invention, (a)-(c) at different amplification rates.

FIG. 3 shows an SEM image of the sample, which shows that the morphology of the sample is in the form of nanospheres, with an average nanosphere size of <100 nm. The fold seen in the middle of the image is likely due to a tape that is used to support the sample.

There is also evidence of nanosticks but there is strong reason to believe that they are also in fact $Ni_2P$. Liu et. al.[4] have observed the formation of such nanosticks projecting from nanospheres in the sample of $Ni_2P$ they prepared in an aqueous environment. They propose that aggregated nanoparticles form nanospheres after which the sticks decorate them. The sticks then propagate to give dendritic structures.

Example 3

This example describes $Ni_2P$ nanoparticles that are synthesized according to one embodiment of the present invention utilizing the exemplary process set forth in EXAMPLE 1, or a process similar to it. In this example, however, $Ni_2P$ nanoparticles are synthesized on a silica support.

Figure 4:
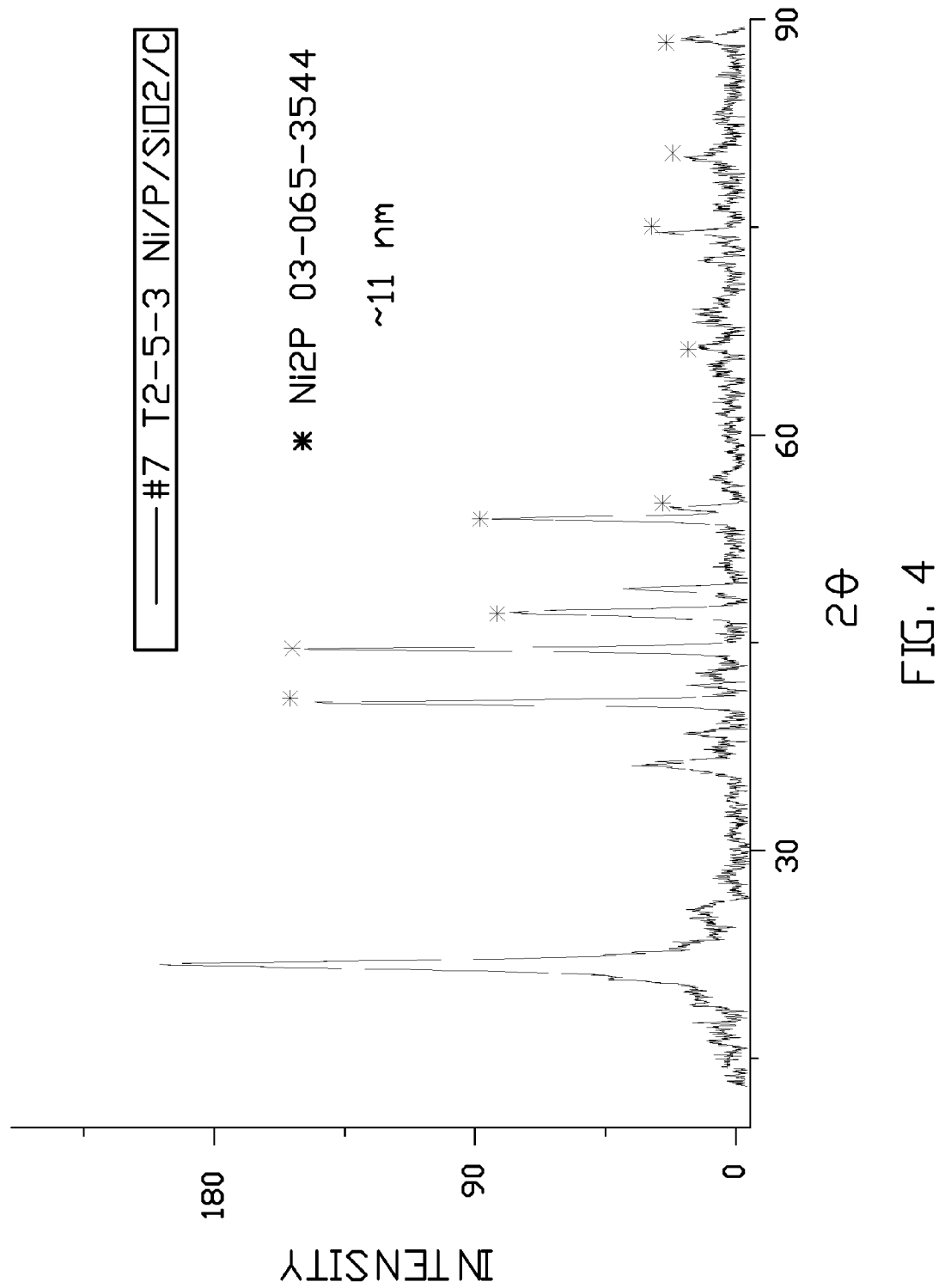
FIG. 4 shows an XRD spectrum of $Ni_2P/C$ made in presence of silica according to one embodiment of the present invention.

FIG. 4 shows an XRD of $Ni_2P$ prepared in the presence of silica. It can be seen that all the peaks expected from $Ni_2P$ are present in the sample. In addition, the characteristic peaks for carbon and silica are also present, respectively. No other peaks are discernable indicating that $SiO_2$ remains unaffected under the reaction conditions.

Example 4

This example describes $Cu_3P$ nanoparticles that are synthesized according to one embodiment of the present invention utilizing the exemplary process set forth in EXAMPLE 1, or a process similar to it.

FIG. 5 shows an SEM image of cuprous phosphide ($Cu_3P$) nanoparticles that are synthesized according to one embodiment of the present invention. The EDX of the region shown on the SEM image is shown on the right. It can be seen from the Table corresponding to the EDX data that there are three copper atoms to every phosphorus atom. The nanoparticles obtained may be described as being comprised of nanospheres decorated with needles.

Example 5

This example describes Tannins that are utilized to practice the present invention.

Tannins are naturally occurring polyphenols that are found in the vascular tissue of plants such as the leaves, bark, grasses, and flowers. Tannins are classified into two groups 16: condensed tannins or proanthocyanidins and hydrolysable tannins from the polyesters of gallic acids.

Figure 6:
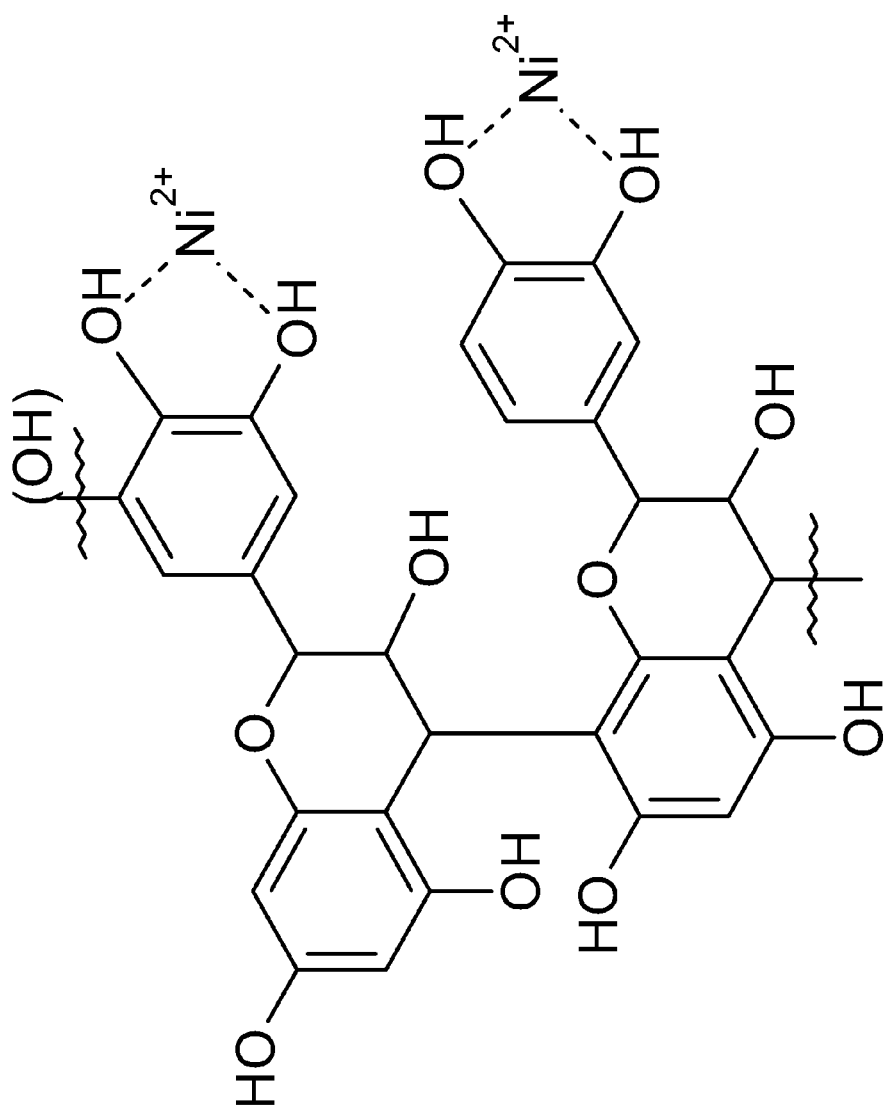
FIG. 6 shows the molecular structure of a dimeric unit of tannin complexed to a metal ion.

FIG. 6 illustrates the structure of a monomeric unit of condensed tannin with Nickel ion complexed to the catechol structure, which is excellent for chelating metal ions.

A particular tannin of interest is Quebracho tannin. This tannin is obtained from the hot water extraction of the heartwoods of Schinopsis balansae and lorentzii, indigenous to Argentina and Paraguay. Quebracho accounts for 30% of the dry weight of the heartwoods with a worldwide production level averaging 177,000 tons per year over the past 30 years, according to the Tannin Corporation, Peabody, Mass. Tannins are commercially available and represent an inexpensive renewable resource.

Example 6

This example describes carbon-metal nanocomposites from tannin-metal complexes, which are synthesized according to one embodiment of the present invention utilizing the exemplary process set forth in EXAMPLE 1, or a process similar to it.

Figure 7:
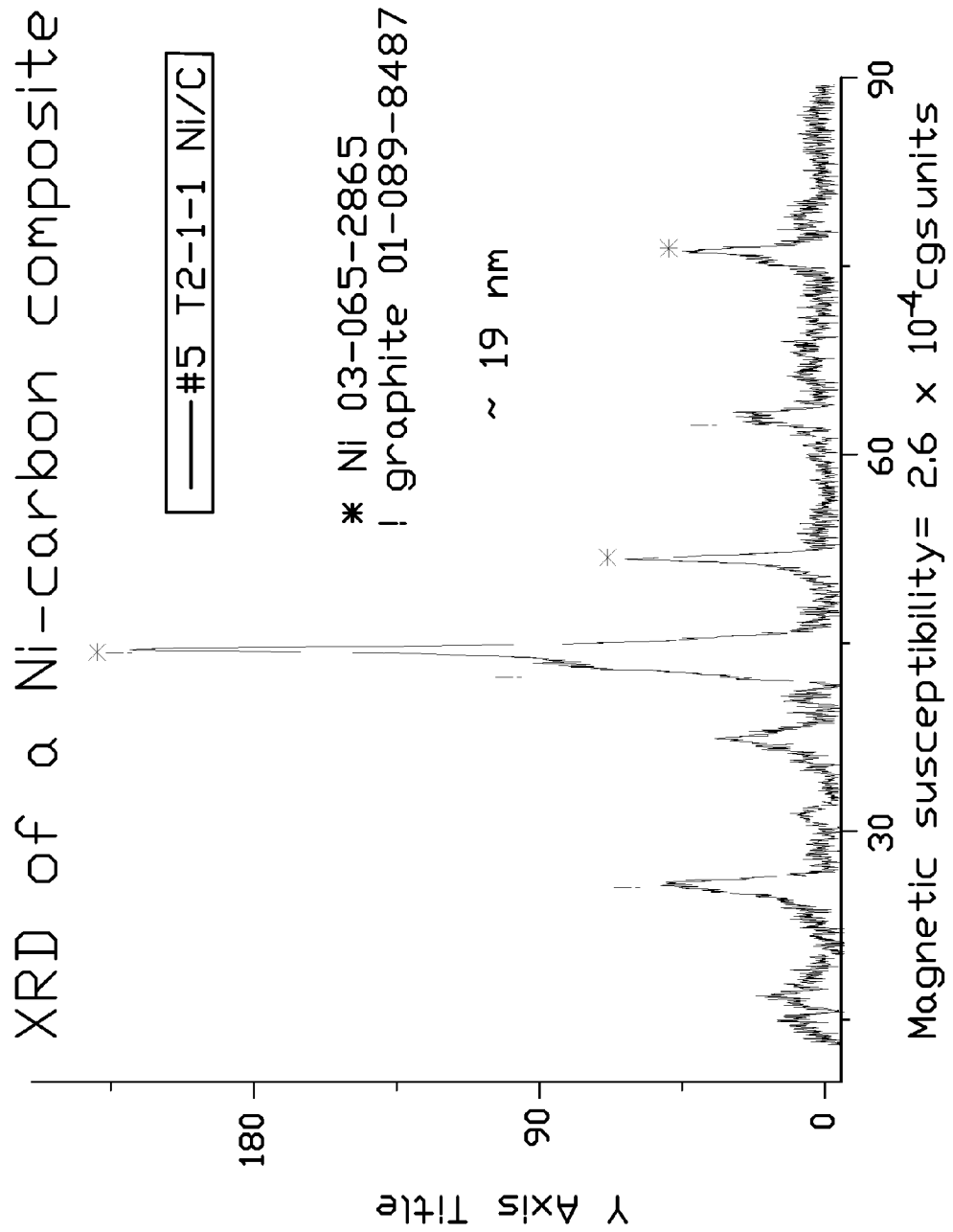
FIG. 7 shows an XRD spectrum of Ni—C composite prepared by the novel method.

FIG. 7 shows the X-Ray Diffractogram (XRD) indicating the presence of elemental metal Nickel and carbon in the sample. Using the Scherrer equation, the crystallite size of the Ni—C nanocomposites was estimated to be 19 nm.

Example 7

This example describes carbon-metal nanocomposites that are synthesized according to one embodiment of the present invention utilizing the exemplary process set forth in EXAMPLE 1, or a process similar to it.

Figure 8:
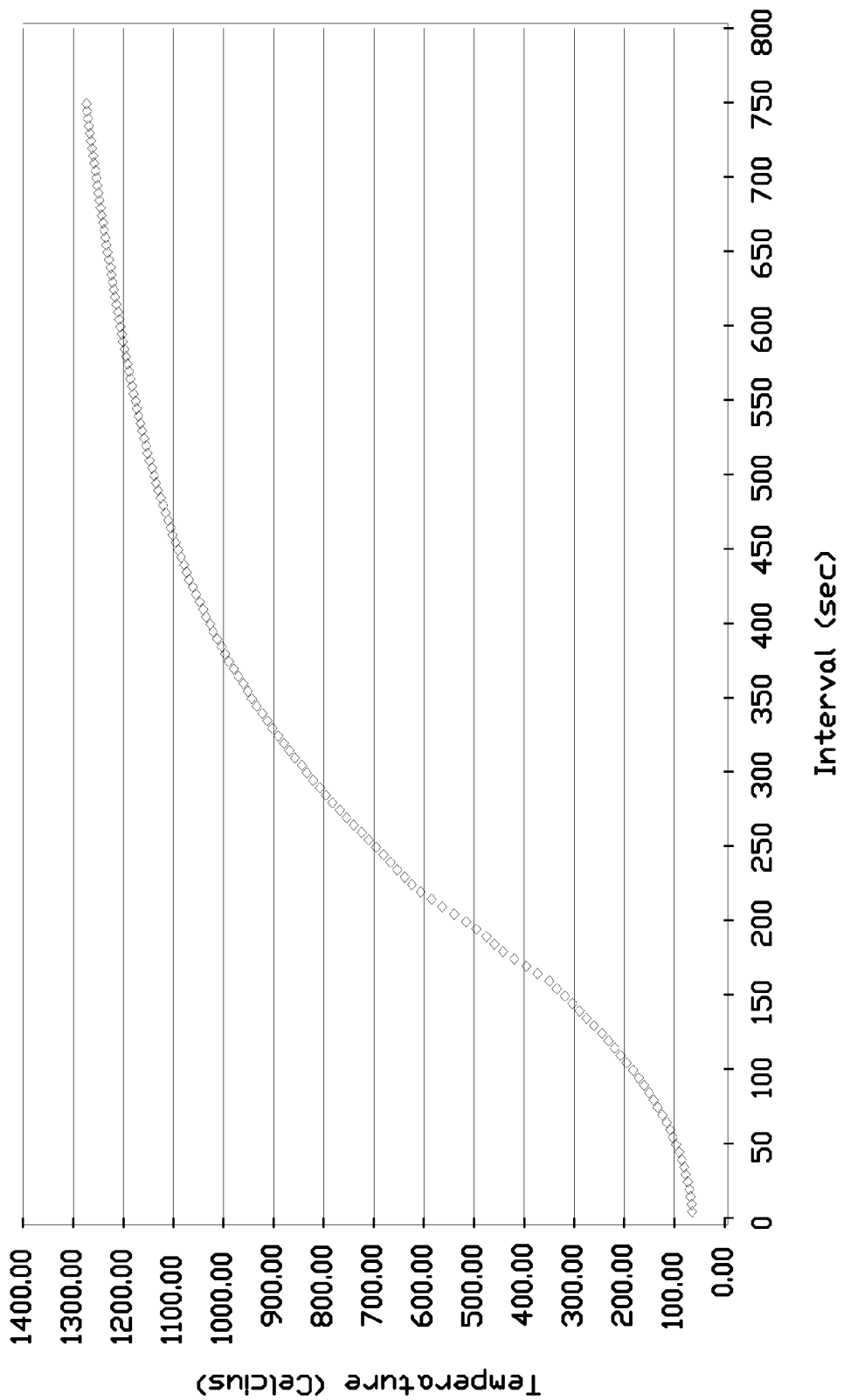
FIG. 8 shows that the temperature increases when 1 g lignin is microwaved with 50 mg graphite powder and 50 mg carbon black powder in a 950 W microwave operating at 2.45 GHz.

FIG. 8 shows a relationship between the temperature and microwave operating time, where the temperature increases when 1 g lignin is microwaved with 50 mg graphite powder and 50 mg carbon black powder in a 950 W microwave oven operating at 2.45 GHz. It is noted that the temperature of the sample in solid form reaches 1,000° C. in less than 6 minutes with a temperature (T) derivative over time (t), $\Delta T/\Delta t$, which is the slope of the dotted curve shown in FIG. 8, no less than 2.5° C./second at least for the first 360 seconds or several minutes (here about 6 minutes).

Example 8

This example describes carbon-metal nanocomposites that are synthesized according to one embodiment of the present invention utilizing the exemplary process set forth in EXAMPLE 1, or a process similar to it.

Figure 9:
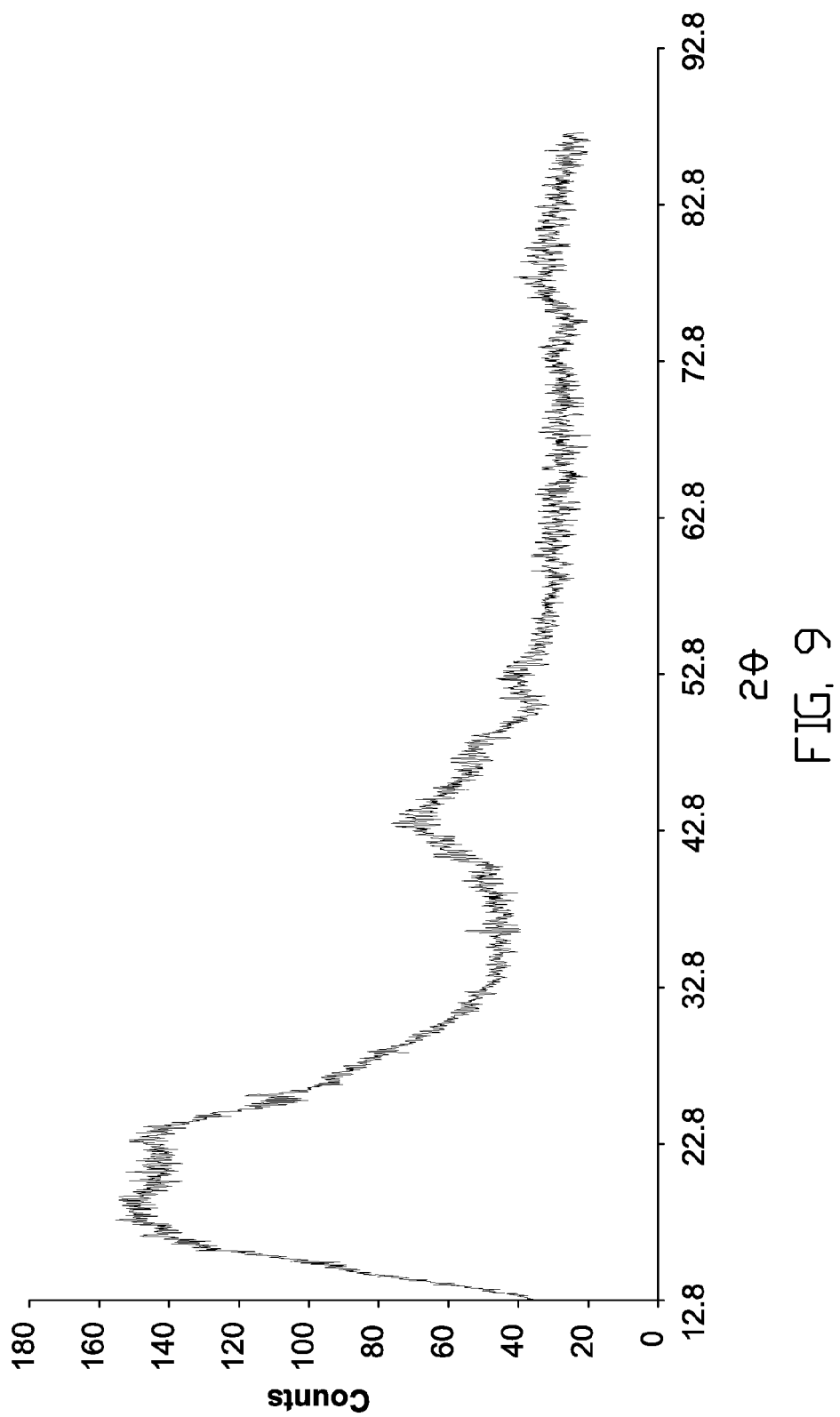
FIG. 9 shows an XRD spectrum with distinctive peaks of carbon obtained from microwaving tannin according to one embodiment of the present invention.

FIG. 9 shows an XRD spectrum with distinctive peaks of carbon obtained from microwaving tannin according to one embodiment of the present invention, which are composed of a broad diffraction peak centered at about 20° 2θ (with a range of 17° and 22°) and another broad peak centered at about 44° 2θ. The peak around 44° is due to nanodiamond. If the maximum intensity of the broad peak at about 20° is at 170 counts, the intensity of the peak at about 44° 2θ is about 70 counts.

Example 9

This example describes carbon-metal nanocomposites that are synthesized according to one embodiment of the present invention utilizing the exemplary process set forth in EXAMPLE 1, or a process similar to it.

Figure 10:
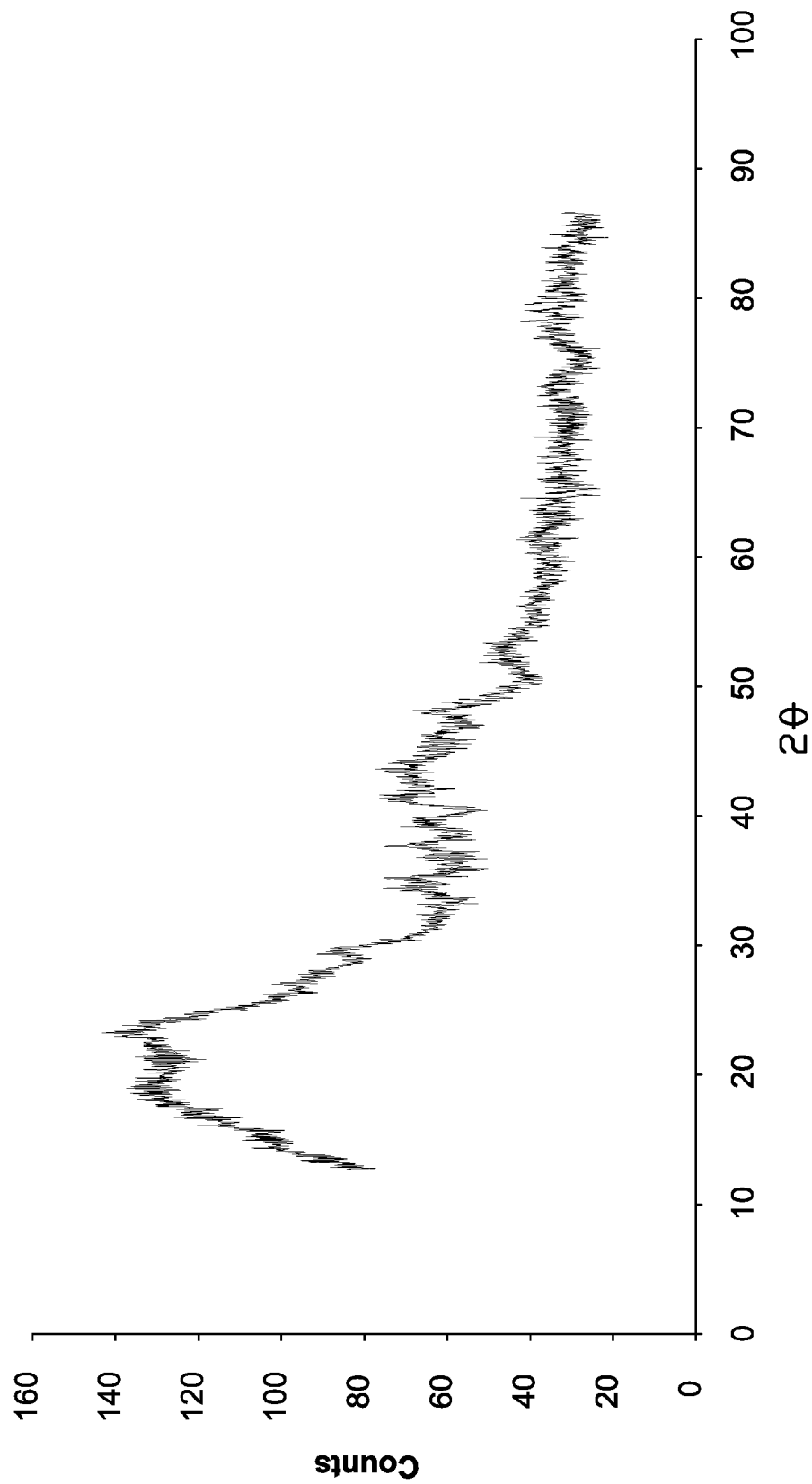
FIG. 10 shows an XRD spectrum with distinctive peaks of carbon obtained from microwaving lignin according to one embodiment of the present invention.

FIG. 10 shows an XRD spectrum with distinctive peaks of carbon obtained from microwaving lignin according to one embodiment of the present invention, which are composed of a broad diffraction peak centered at about 21° 2θ (with a range of 18° and 24°) and another broad peak centered at about 44° 2θ. The peak centered around 44° is due to nanodiamond. If the maximum intensity of the broad peak at about 20° is at 134 counts the intensity of the peak at about 44° 2θ is about 70 counts.

Example 10

This example describes carbon-metal nanocomposites that are synthesized according to one embodiment of the present invention utilizing the exemplary process set forth in EXAMPLE 1, or a process similar to it.

Figure 11:
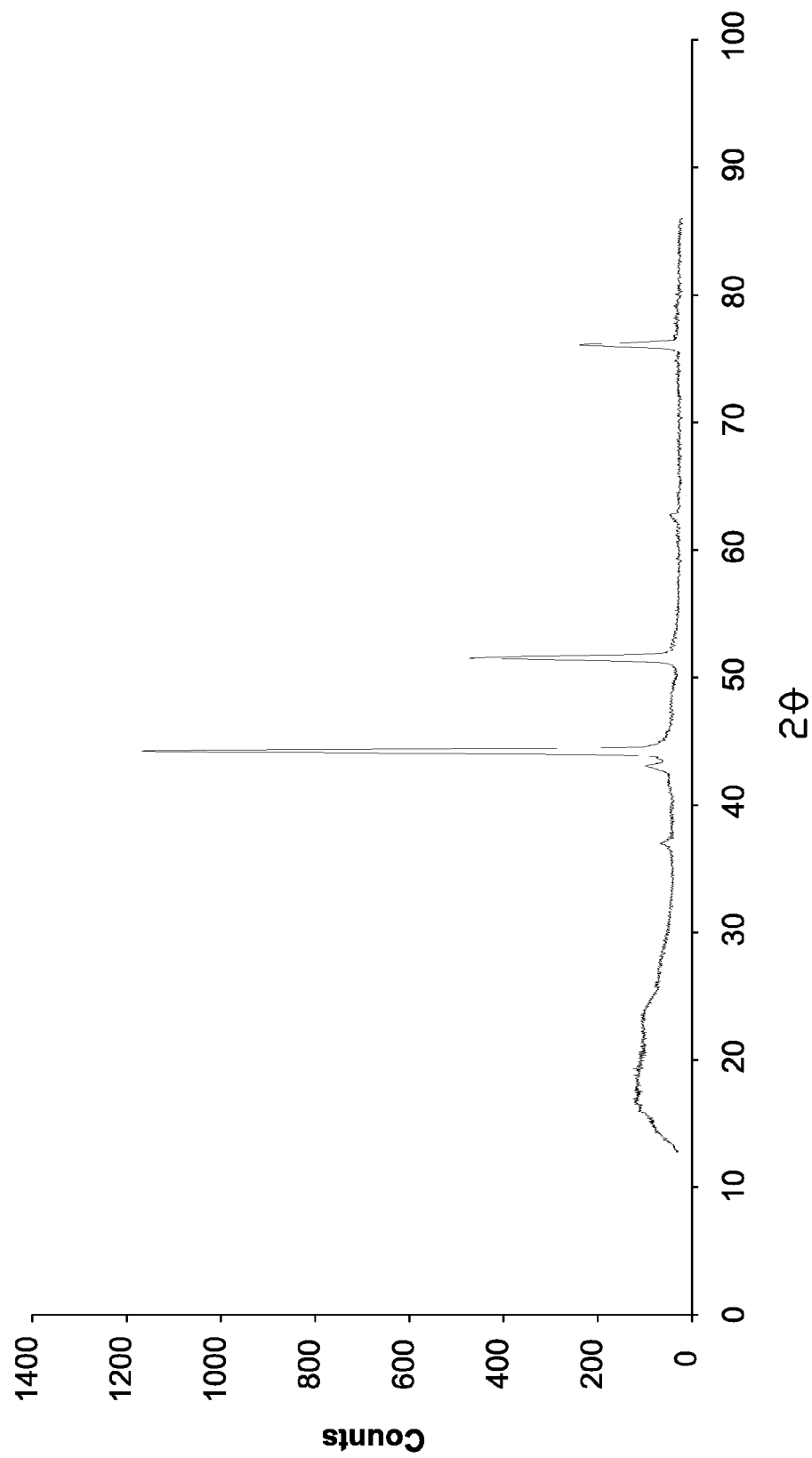
FIG. 11 shows an XRD spectrum for a carbon-nickel composite synthesized by microwaving a tannin-nickel complex according to one embodiment of the present invention.

FIG. 11 shows an XRD spectrum for a carbon-nickel composite synthesized by microwaving a tannin-nickel complex according to one embodiment of the present invention, which includes a broad diffraction peak centered at about 21° 2θ (with a range of 17° and 24°) and other peaks centered at about 37.4 and 43.2° 2θ. The peak at 43.2° is due to nanodiamond. If the maximum intensity of the broad peak at about 21° is at 110 counts, the intensity of the peak at about 43° 2θ is about 88 counts. Sharp peaks at about 45°, about 52° and about 76° 2θ values represent the peaks due to Nickel nanoparticles, respectively.

Example 11

This example describes carbon-metal nanocomposites that are synthesized according to one embodiment of the present invention utilizing the exemplary process set forth in EXAMPLE 1, or a process similar to it.

Figure 12:
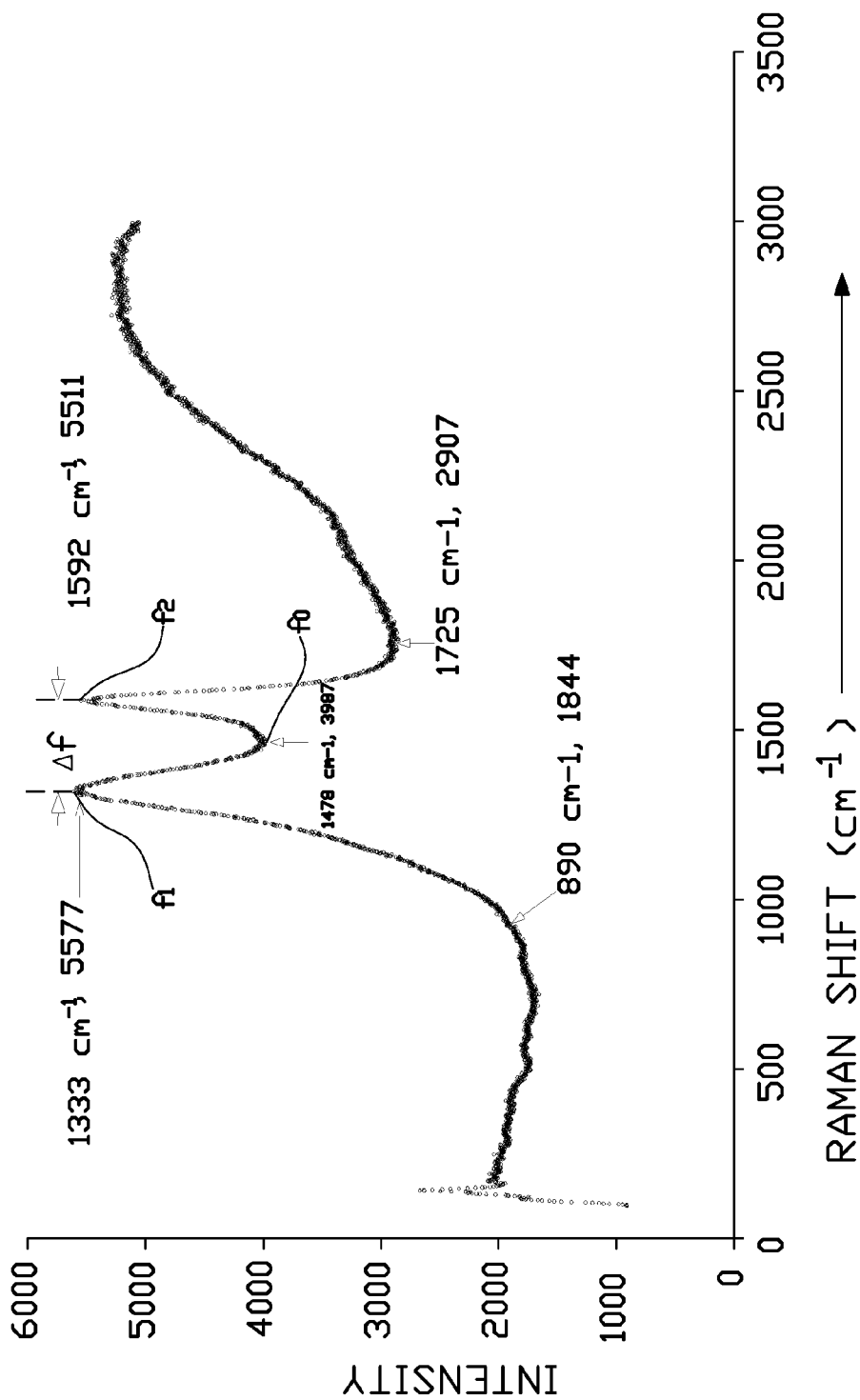
FIG. 12 shows a Raman spectrum of carbon produced from microwaving tannin (without added carbon) according to one embodiment of the present invention. The wavelength is followed by the intensity of the signal.

FIG. 12 shows a Raman spectrum of carbon produced from microwaving tannin (without added carbon) according to one embodiment of the present invention. The wavelength is followed by the intensity of the signal. This figure shows a typical Raman spectroscopic data of carbon produced by the inventor in lab from tannin (in the absence of metal atoms or added carbon). The Raman spectrum shows a peak at $f_1=1592$ cm$^{-1}$ which represents the G-band (carbon with a graphitic nature) due to the $E_{2g}$ mode (stretching) related to the sp$^2$ carbons. The peak centered at $f_2=1333$ cm$^{-1}$ may be due to nanodiamond in addition to $A_{1g}$ mode (breathing mode) of sp$^2$ carbons in ring. The broad peak that shows a maximum around 2700 cm$^{-1}$ may be ascribed to the first overtone of the band centered at 1333 cm$^{-1}$. The Raman spectrum shows that a unique form of carbon is being produced by a method according to one embodiment of the present invention. Further note that the difference or the frequency shift between $f_1$ and $f_2$ is $\Delta f=f_1-f_2=262$ cm$^{-1}$, which is bottomed at about $f_0=1478$ cm$^{-1}$.

Example 12

This example describes carbon-metal nanocomposites that are synthesized according to one embodiment of the present invention utilizing the exemplary process set forth in EXAMPLE 1, or a process similar to it.

Figure 13:
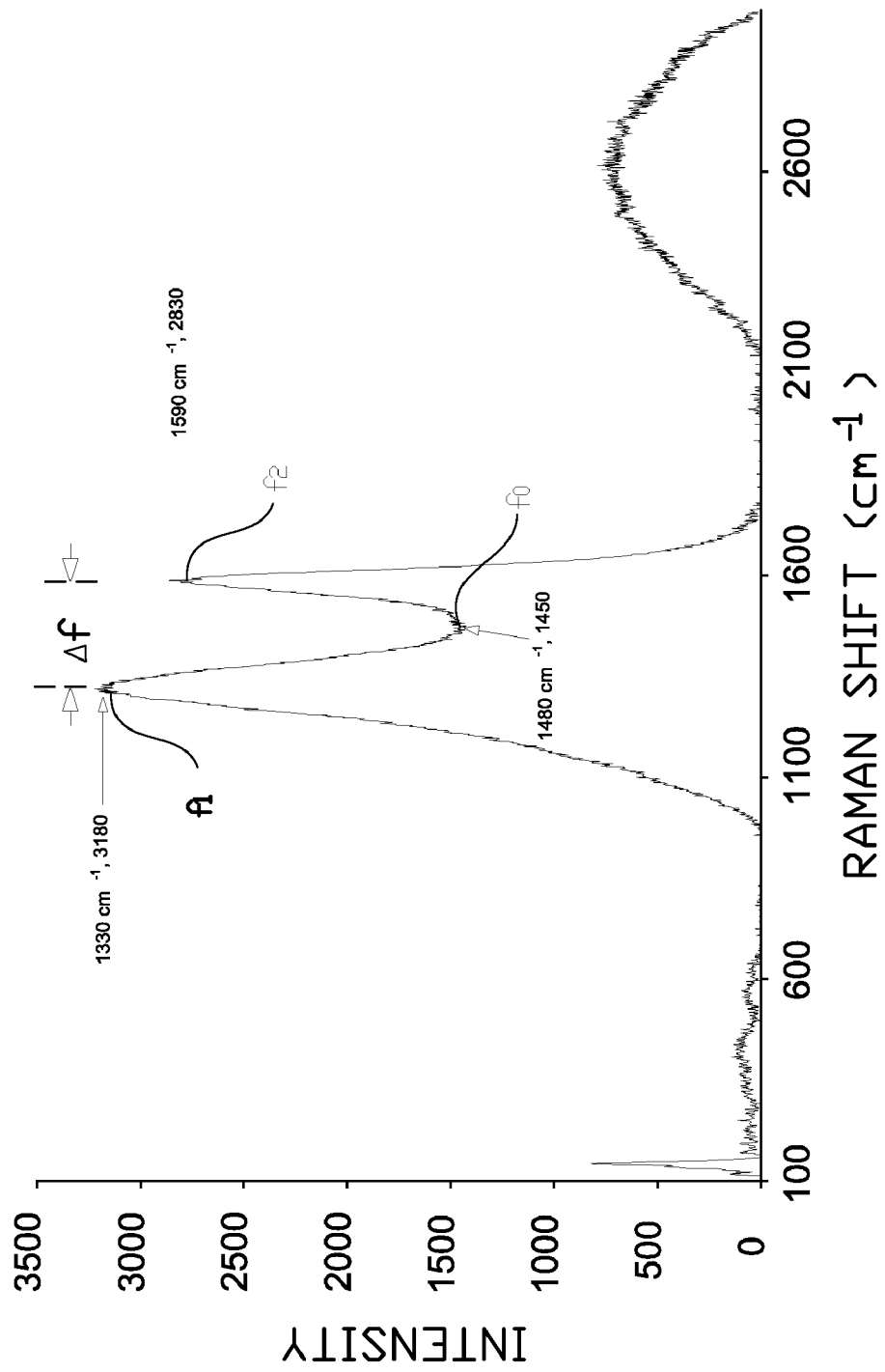
FIG. 13 shows a Raman spectrum of carbon produced from microwaving tannin (without added carbon) according to one embodiment of the present invention. The wavelength is followed by the intensity of the signal.

FIG. 13 shows a Raman spectrum of carbon produced from microwaving tannin (without added carbon) according to one embodiment of the present invention. The wavelength is followed by the intensity of the signal. This figure shows a typical Raman spectroscopic data of carbon produced by the inventor in lab from tannin (in the absence of metal atoms or added carbon). The baseline corrected Raman spectrum shows a peak at $f_1=1590$ cm$^{-1}$ which represents the G-band (carbon with a graphitic nature) due to the $E_{2g}$ mode (stretching) related to the sp$^2$ carbons. The diffuse band (D-band) occurs around $f_2=1330$ cm$^{-1}$ and represents the $A_{1g}$ mode (breathing) as well as C atoms designated as nanodiamond. The broad peak that shows a maximum around 2700 cm$^{-1}$ may be ascribed to the first overtone of the D band. The Raman spectrum shows that a unique form of carbon is being produced by a method according to one embodiment of the present invention. Further note that the difference or the frequency shift between fI and $f_2$ is $\Delta f=f_1-f_2=260$ cm$^{-1}$, which is bottomed at about $f_0=1480$ cm$^{-1}$.

Example 13

This example describes carbon-metal nanocomposites that are synthesized according to one embodiment of the present invention utilizing the exemplary process set forth in EXAMPLE 1, or a process similar to it.

Figure 14:
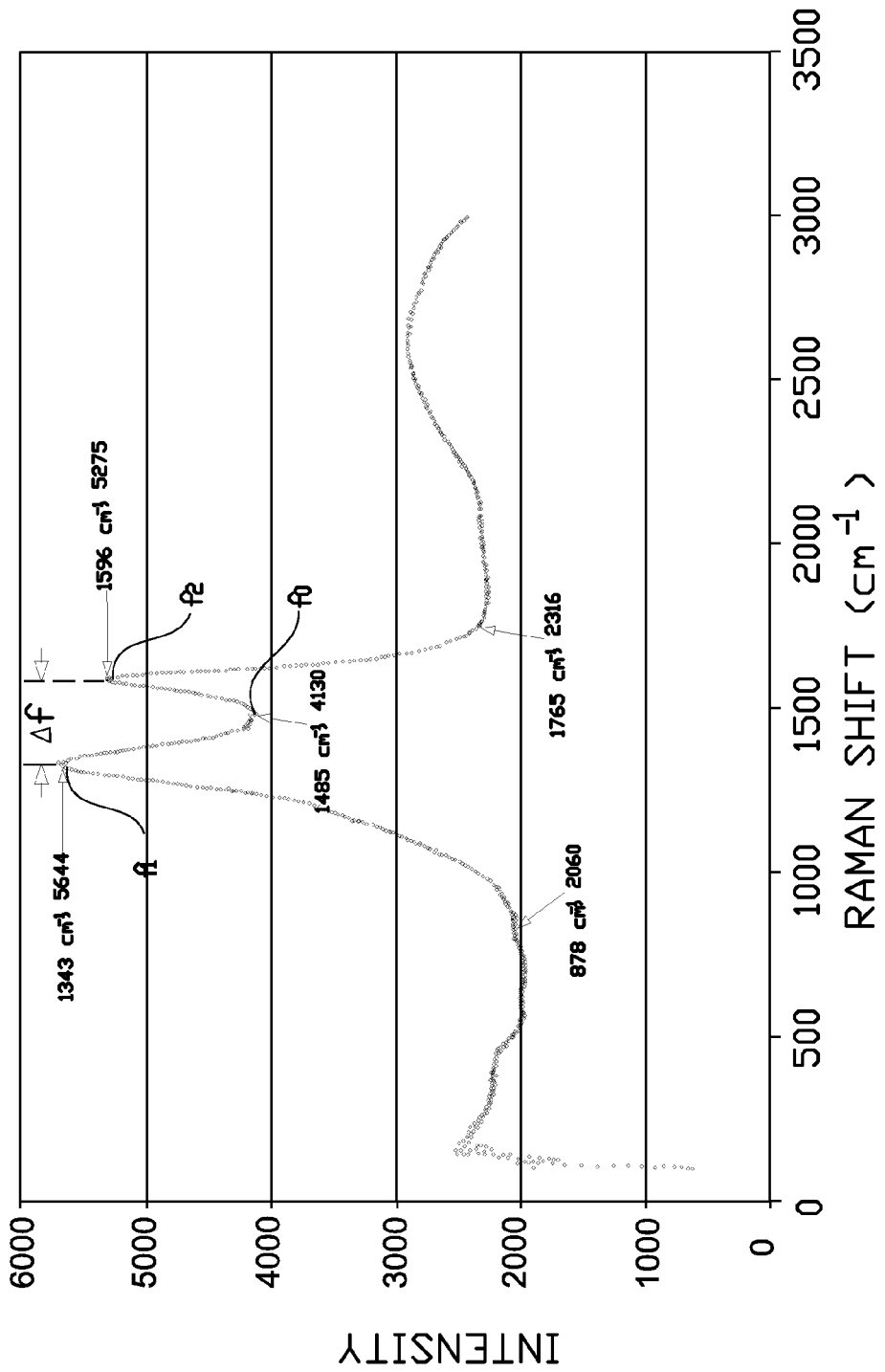
FIG. 14 shows a Raman spectrum of lignin produced by microwaving lignin (without added carbon) according to one embodiment of the present invention. The frequency of signal is followed by intensity.

FIG. 14 shows a Raman spectrum of lignin produced by microwaving lignin (without added carbon) according to one embodiment of the present invention. The frequency of signal is followed by intensity. This figure shows a typical Raman spectroscopic data of carbon produced by the inventor in lab from sodium salt of lignin (in the absence of metal atoms or added carbon). The Raman spectrum shows a peak at $f_1=1596$ cm$^{-1}$ which represents the G-band (graphite) is due to the $E_{2g}$ mode (stretching) related to the sp$^2$ carbons. The diffuse band (D-band) occurs around $f_2=1343$ cm$^{-1}$ and represents the $A_{1g}$ mode (breathing) and may be associated with C atoms in nanodiamond. The broad peak that shows a maximum around 2700 cm$^{-1}$ may be ascribed to the first overtone of the D band. The Raman spectrum shows that carbon is being produced by a method according to one embodiment of the present invention. Further note that the difference or the frequency shift between $f_1$ and $f_2$ is $\Delta f=f_1-f_2=253$ cm$^{-1}$, which is bottomed at about $f_0=1485$ cm$^{-1}$.

Example 14

This example describes carbon-metal nanocomposites that are synthesized according to one embodiment of the present invention utilizing the exemplary process set forth in EXAMPLE 1, or a process similar to it.

Figure 15:
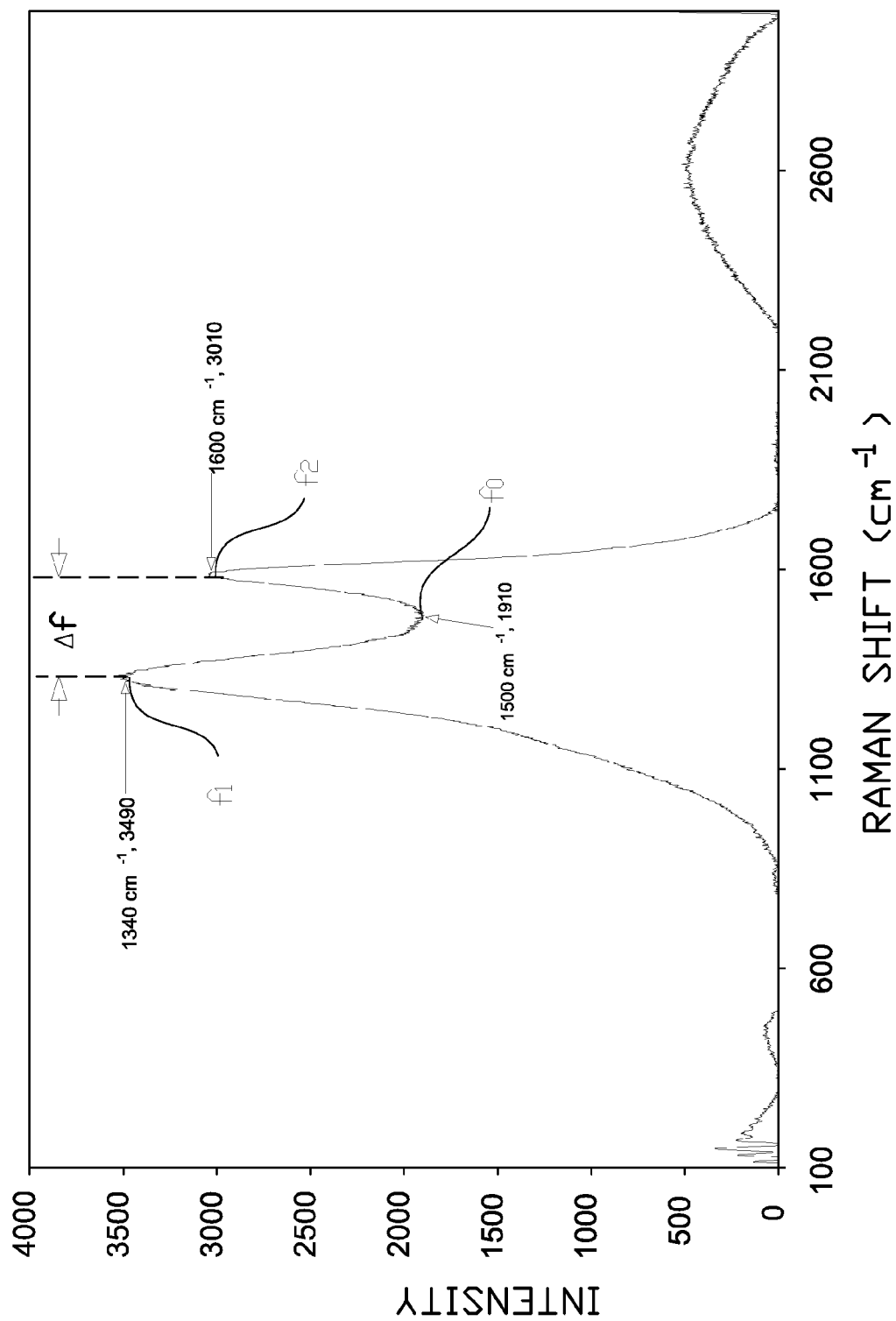
FIG. 15 shows a Raman spectrum of lignin produced by microwaving lignin (without added carbon) according to one embodiment of the present invention. The frequency of signal is followed by intensity.

FIG. 15 shows a Raman spectrum of lignin produced by microwaving lignin (without added carbon) according to one embodiment of the present invention. The frequency of signal is followed by intensity. This figure shows a typical Raman spectroscopic data of carbon produced by the inventor in lab from sodium salt of lignin (in the absence of metal atoms or added carbon). The baseline corrected Raman spectrum shows a peak at around $f_1=1600$ cm$^{-1}$ which represents the G-band (graphite) is due to the $E_{2g}$ mode (stretching) related to the sp$^2$ carbons. The diffuse band (D-band) occurs around $f_2=1340$ cm$^{-1}$ and represents the $A_{1g}$ mode (breathing) and may be associated with C atoms in nanodiamond. The broad peak that shows a maximum around 2700 cm$^{-1}$ may be ascribed to the first overtone of the D band. The Raman spectrum shows that a unique carbon nanostructure is being produced by a method according to one embodiment of the present invention. Further note that the difference or the frequency shift between $f_1$ and $f_2$ is $\Delta f=f_1-f_2=260$ cm$^{-1}$, which is bottomed at about $f_0=1500$ cm$^{-1}$.

Example 15

This example describes carbon-metal nanocomposites that are synthesized according to one embodiment of the present invention utilizing the exemplary process set forth in EXAMPLE 1, or a process similar to it.

Figure 16:
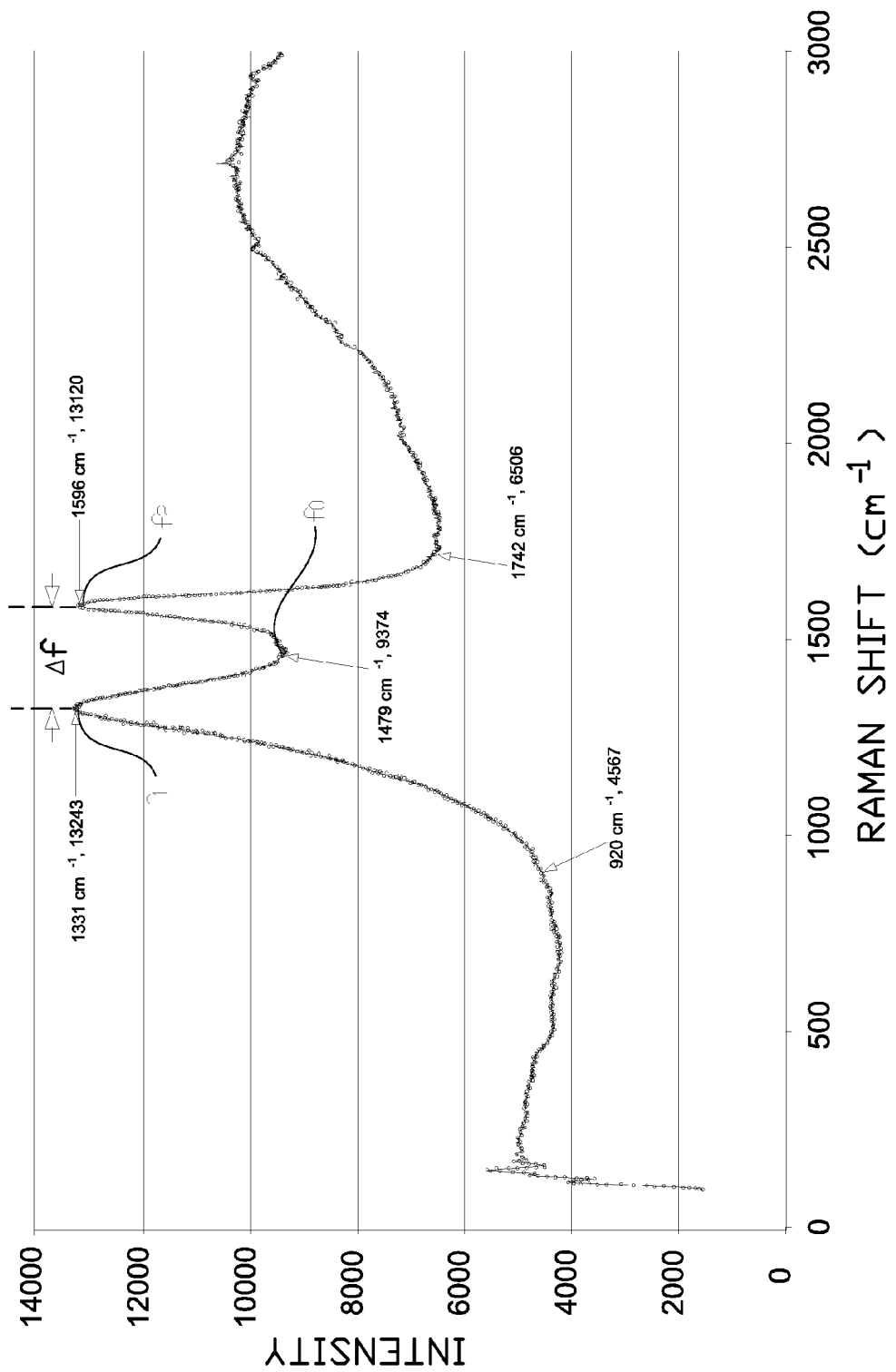
FIG. 16 shows a Raman spectrum of carbon produced from tannin-formaldehyde condensation product (no carbon added) according to one embodiment of the present invention. The frequency of signal is followed by intensity.

FIG. 16 shows a Raman spectrum of carbon produced from tannin-formaldehyde condensation product (no carbon added) according to one embodiment of the present invention. The frequency of signal is followed by intensity. This figure shows a typical Raman spectroscopic data of carbon produced by the inventor in lab from microwaving (in the absence of metal atoms or added carbon) the reaction product of tannin and formaldehyde. The Raman spectrum shows a peak at around $f_1=1596$ cm$^{-1}$ representing the G-band (graphite) and is due to the $E_{2g}$ mode (stretching) related to the sp$^2$ carbons. The diffuse band (D-band) occurs around $f_2=1331$ cm$^{-1}$ and represents the $A_{1g}$ mode (breathing) of sp$^2$ carbons in rings and may be associated with C atoms in nanodiamond. The broad peak that shows a maximum around 2700 cm$^{-1}$ may be ascribed to the first overtone of the D band. The Raman spectrum shows that a unique carbon nanostructure is being produced by a method according to one embodiment of the present invention. Further note that the difference or the frequency shift between $f_1$ and $f_2$ is $\Delta f=f_1-f_2=265$ cm$^{-1}$, which is bottomed at about $f_0=1479$ cm$^{-1}$.

Example 16

This example describes carbon-metal nanocomposites that are synthesized according to one embodiment of the present invention utilizing the exemplary process set forth in EXAMPLE 1, or a process similar to it.

Figure 17:
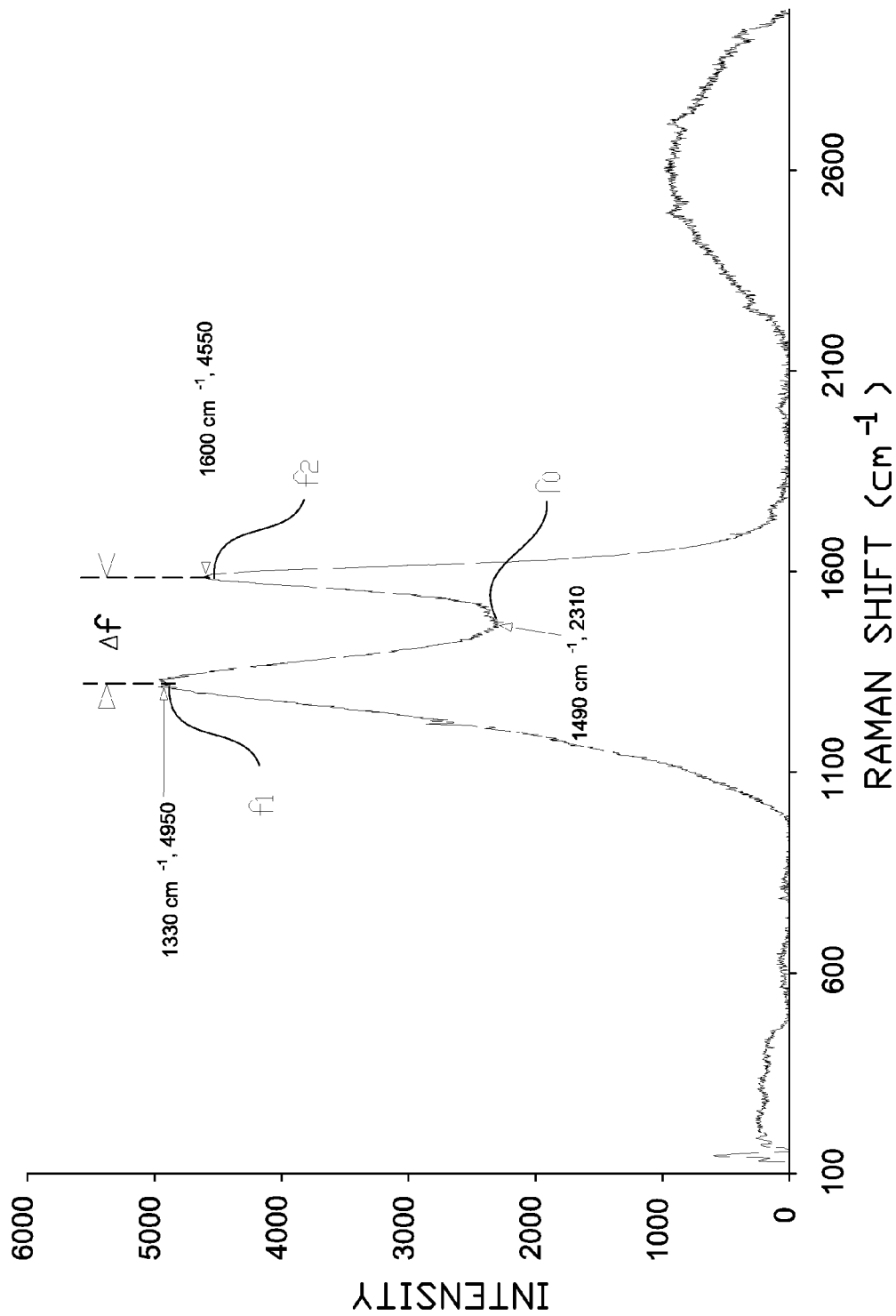
FIG. 17 shows a Raman spectrum of carbon produced from tannin-formaldehyde condensation product (no carbon added) according to one embodiment of the present invention. The frequency of signal is followed by intensity.

FIG. 17 shows a Raman spectrum of carbon produced from tannin-formaldehyde condensation product (no carbon added) according to one embodiment of the present invention. The frequency of signal is followed by intensity. This figure shows a typical Raman spectroscopic data of carbon produced by the inventor in lab from the reaction product of tannin and formaldehyde (in the absence of metal atoms or added carbon). The baseline corrected Raman spectrum shows a peak at around $f_1=1600$ cm$^{-1}$ which represents the G-band (graphite) is due to the $E_{2g}$ mode (stretching) related to the sp$^2$ carbons. The diffuse band (D-band) occurs around $f_2=1330$ cm$^{-1}$ and represents the $A_{1g}$ mode (breathing) and may be associated with C atoms in nanodiamond. The broad peak that shows a maximum around 2700 cm$^{-1}$ may be ascribed to the first overtone of the D band. The Raman spectrum shows that a unique carbon nanostructure is being produced by a method according to one embodiment of the present invention. Further note that the difference or the frequency shift between $f_1$ and $f_2$ is $\Delta f=f_1-f_2=270$ cm$^{-1}$, which is bottomed at about $f_0=1490$ cm$^{-1}$.

Example 17

This example describes carbon-metal nanocomposites that are synthesized according to one embodiment of the present invention utilizing the exemplary process set forth in EXAMPLE 1, or a process similar to it.

Figure 18:
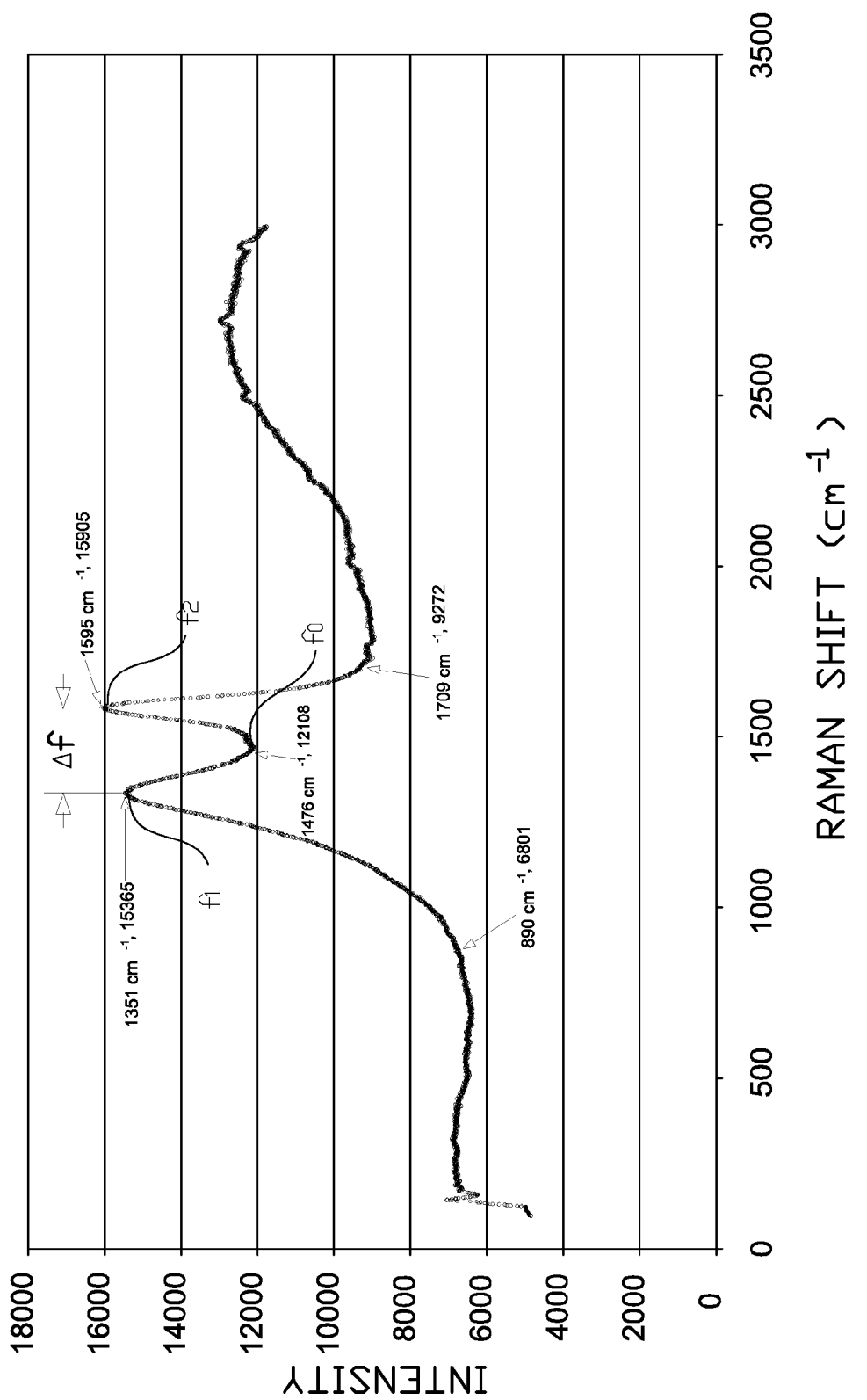
FIG. 18 shows a Raman spectrum of carbon composite prepared by microwaving nickel-tannin composite (no carbon added) according to one embodiment of the present invention. The frequency of signal is followed by intensity.

FIG. 18 shows a Raman spectrum of carbon composite prepared by microwaving nickel-tannin composite (no carbon added) according to one embodiment of the present invention. The frequency of signal is followed by intensity. This figure shows a typical Raman spectroscopic data of carbon produced by the inventor in lab from microwaving (in the absence of metal atoms or added carbon) the reaction product of tannin and nickel salt. The Raman spectrum shows a peak at around $f_1=1595$ cm$^{-1}$ which represents the G-band (from graphitic natured carbon) and is due to the $E_{2g}$ mode (stretching) related to the sp$^2$ carbons. The diffuse band (D-band) occurs around $f_2=1351$ cm$^{-1}$ and represents the $A_{1g}$ mode (breathing) mode of sp$^2$ C atoms in rings. The measure of $I_G/I_D$ intensity ratio is generally used as a measure of graphite ordering. The broad peak that shows a maximum around 2700 cm$^{-1}$ may be ascribed to the first overtone of the D band. The Raman spectrum shows that a unique carbon nanostructure is being produced by a method according to one embodiment of the present invention. Further note that the difference or the frequency shift between $f_1$ and $f_2$ is $\Delta f=f_1-f_2=244$ cm$^{-1}$, which is bottomed at about $f_0=1476$ cm$^{-1}$.

Example 18

This example describes carbon-metal nanocomposites that are synthesized according to one embodiment of the present invention utilizing the exemplary process set forth in EXAMPLE 1, or a process similar to it.

Figure 19:
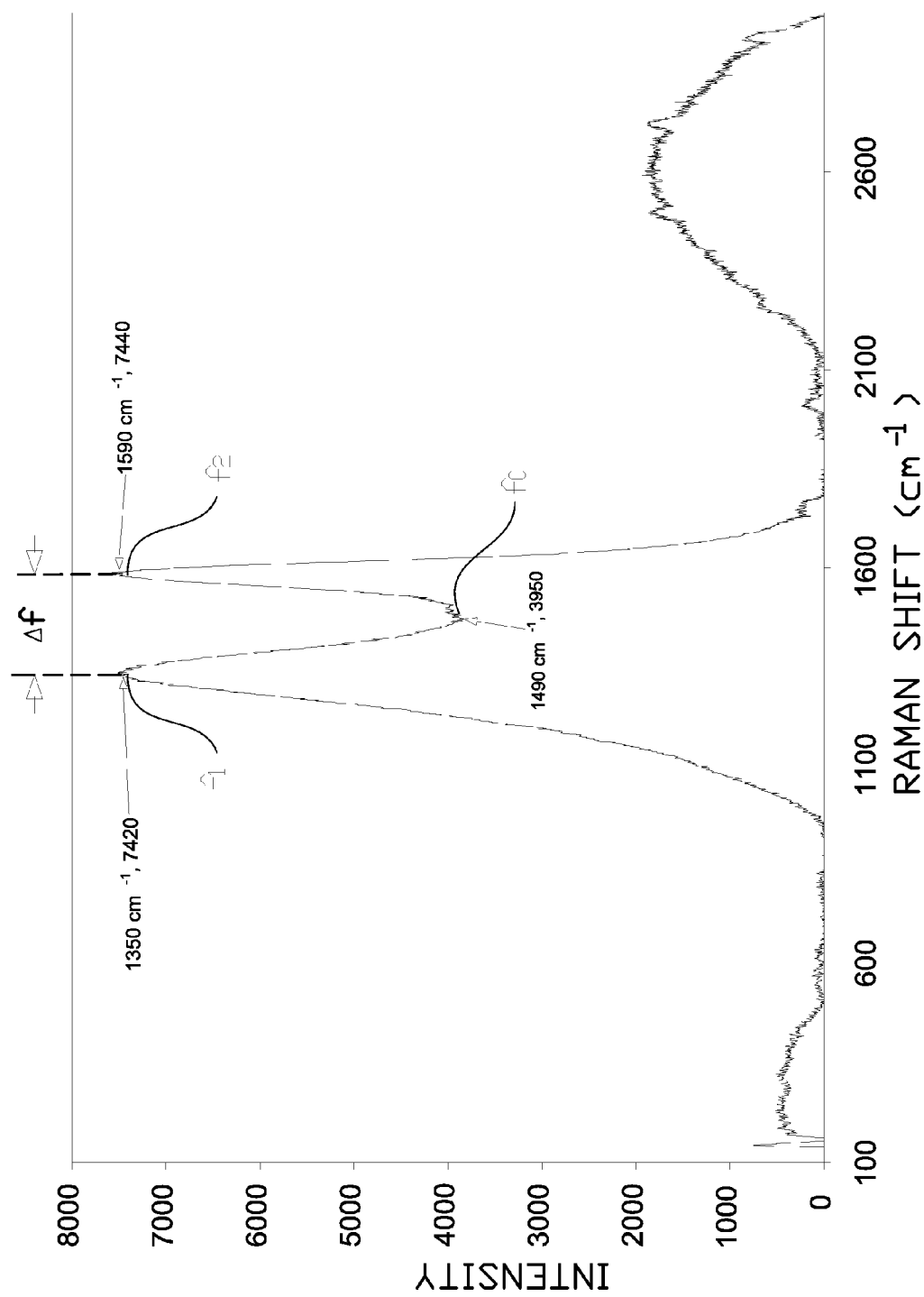
FIG. 19 shows a Raman spectrum of carbon composite prepared by microwaving nickel-tannin composite (no carbon added) according to one embodiment of the present invention. The frequency of signal is followed by intensity.

FIG. 19 shows a Raman spectrum of carbon composite prepared by microwaving nickel-tannin composite (no carbon added) according to one embodiment of the present invention. The frequency of signal is followed by intensity. This figure shows a typical Raman spectroscopic data of carbon produced by the inventor in lab from microwaving (in the absence of metal atoms or added carbon) the reaction product of tannin and nickel salt. The baseline corrected Raman spectrum shows a peak at around $f_1=1590$ cm$^{-1}$ which represents the G-band (from graphitic natured carbon) is due to the $E_{2g}$ mode (stretching) related to the sp$^2$ carbons. The diffuse band (D-band) occurs around $f_2=1350$ cm$^{-1}$ and represents the $A_{1g}$ mode (breathing) mode of sp$^2$ C atoms in rings. The measure of $I_G/I_D$ intensity ratio is generally used as a measure of graphite ordering. The broad peak that shows a maximum around 2700 cm$^{-1}$ may be ascribed to the first overtone of the D band. The Raman spectrum shows that a unique carbon nanostructure is being produced by a method according to one embodiment of the present invention. Further note that the difference or the frequency shift between $f_1$ and $f_2$ is $\Delta f=f_1-f_2=240$ cm$^{-1}$, which is bottomed at about $f_0=1490$ cm$^{-1}$.

Example 19

This example describes carbon-metal nanocomposites that are synthesized according to one embodiment of the present invention utilizing the exemplary process set forth in EXAMPLE 1, or a process similar to it.

Figure 20:
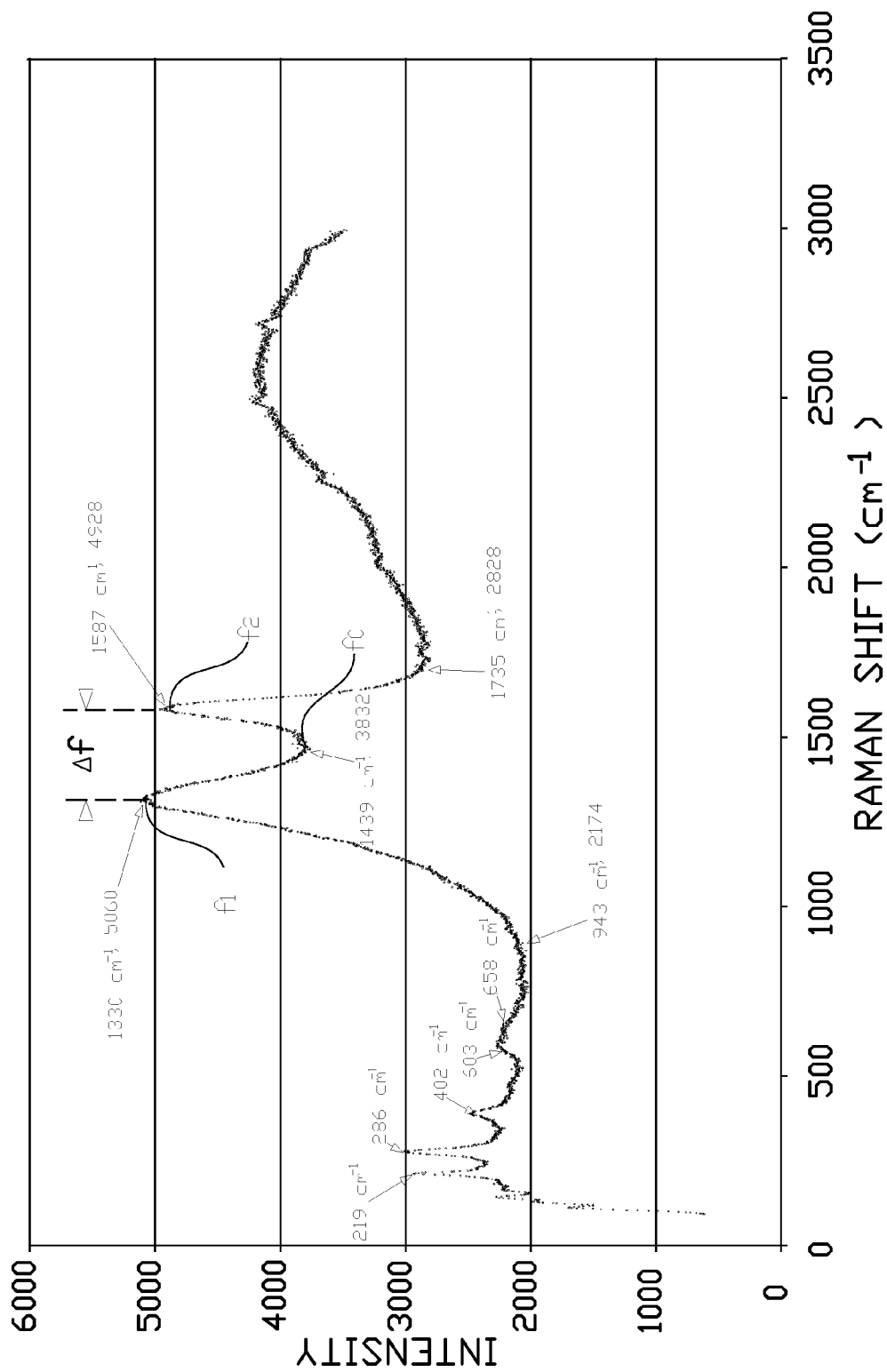
FIG. 20 shows a Raman spectrum of carbon composite prepared by microwaving iron (III)-lignosulfonate (no carbon added) according to one embodiment of the present invention. Number following frequency of signal (if shown) represents intensity.

FIG. 20 shows a Raman spectrum of carbon composite prepared by microwaving iron (III)-lignosulfonate (no carbon added) according to one embodiment of the present invention. Number following frequency of signal (if shown) represents intensity. This figure shows a typical Raman spectroscopic data of carbon produced by the inventor in lab from microwaving (in the absence of metal atoms or added carbon) the reaction product of lignosulfonate and ferric ion. The Raman spectrum shows a peak at around $f_1=1587$ cm$^{-1}$ which represents the G-band (from graphitic natured carbon) and is due to the $E_{2g}$ mode (stretching) related to the sp$^2$ carbons. The diffuse band (D-band) occurs around $f_2=1330$ cm$^{-1}$ and may be associated with C atoms in nanodiamond. The broad peak that shows a maximum around 2700 cm$^{-1}$ may be ascribed to the first overtone of the D band. The Raman spectrum shows that a unique carbon nanostructure is being produced by a method according to one embodiment of the present invention. Peaks below 1000 cm$^{-1}$ arise from iron-oxygen bonds. Further note that the difference or the frequency shift between $f_1$ and $f_2$ is $\Delta f=f_1-f_2=257$ cm$^{-1}$, which is bottomed at about $f_0=1439$ cm$^{-1}$.

Example 20

This example describes carbon-metal nanocomposites that are synthesized according to one embodiment of the present invention utilizing the exemplary process set forth in EXAMPLE 1, or a process similar to it.

Figure 21:
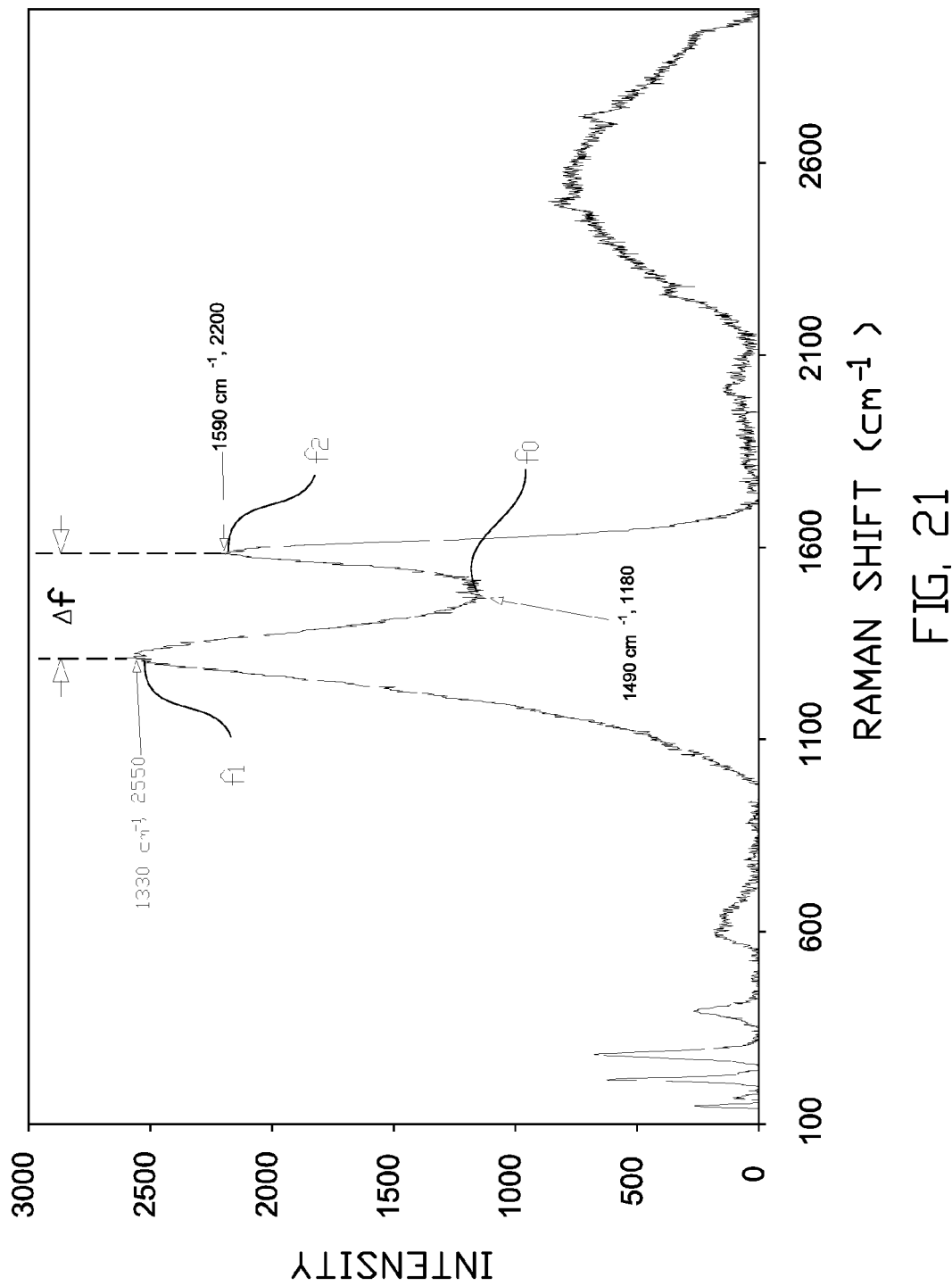
FIG. 21 shows a Raman spectrum of carbon composite prepared by microwaving iron (III)-lignosulfonate (no carbon added) according to one embodiment of the present invention. Number following frequency of signal (if shown) represents intensity.

FIG. 21 shows a Raman spectrum of carbon composite prepared by microwaving iron (III)-lignosulfonate (no carbon added) according to one embodiment of the present invention. Number following frequency of signal (if shown) represents intensity. This figure shows a typical Raman spectroscopic data of carbon produced by the inventor in lab from microwaving (in the absence of metal atoms or added carbon) the reaction product of lignosulfonate and ferric ion. The Raman spectrum shows a peak at around $f_1=1590$ cm$^{-1}$ which represents the G-band (from graphitic natured carbon) and is due to the $E_{2g}$ mode (stretching) related to the sp$^2$ carbons. The diffuse band (D-band) occurs at $f_2=1330$ cm$^{-1}$ and may be associated with C atoms in nanodiamond. The broad peak that shows a maximum around 2700 cm$^{-1}$ may be ascribed to the first overtone of the D band. The Raman spectrum shows that a unique carbon nanostructure is being produced by a method according to one embodiment of the present invention. Peaks below 1000 cm$^{-1}$ arise from iron-oxygen bonds. Further note that the difference or the frequency shift between $f_1$ and $f_2$ is $\Delta f=f_1-f_2=260$ cm$^{-1}$, which is bottomed at about $f_0=1490$ cm$^{-1}$.

Example 21

This section provides various exemplary applications of the carbon and carbon-metal nano-composites that are synthesized according to one embodiment of the present invention utilizing the exemplary process set forth in EXAMPLE 1, or a process similar to it.

In one aspect, the transition metal phosphide materials that are synthesized according to one embodiment of the present invention may have a plethora of multi-functional applications including their use as catalysts in a variety of chemical reactions such as hydrodesulfurization and hydrodenitrogenation of petroleum feedstocks.

In another aspect, the transition metal phosphide materials that are synthesized according to one embodiment of the present invention can be used as electrode materials.

In yet another aspect, the transition metal phosphide materials that are synthesized according to one embodiment of the present invention can be used in light emitting diodes.

In a further aspect, the transition metal phosphide materials that are synthesized according to one embodiment of the present invention can be used as optical and magnetic recording materials.

In another aspect, the transition metal phosphide materials that are synthesized according to one embodiment of the present invention can be used as lubricants.

In yet another aspect, the transition metal phosphide materials that are synthesized according to one embodiment of the present invention can be used in lithium batteries.

In another aspect, the transition metal phosphide materials that are synthesized according to one embodiment of the present invention can be used in thin film transistors.

In another aspect, the transition metal phosphide materials that are synthesized according to one embodiment of the present invention can be used in high speed electronic devices.

Additional applications of the transition metal phosphide materials that are synthesized according to various embodiments of the present invention can be found in Table I set forth below.

Full potential of the myriad uses of these materials and further research will not be possible until they become more affordable both in a lab as well as in an industrial scale. This technology will bridge the gap by offering a unique, simple, cost effective and scalable technique that could play a significant role in large scale production of these materials. The known synthetic techniques for the preparation of transition metal phosphides, among other things, are tedious, expensive, time consuming, relatively unsafe and are not easily scalable. These procedures use gases such as Hydrogen and Argon or may use highly reactive, toxic precursors such as Phosphorus or Phosphine gas and may use carcinogenic solvents such as benzene during the purification procedure.

TABLE I

A few applications of metal phosphides

| | |
|---|---|
| $Ni_2P$: | catalyst for simultaneous hydroprocessing (hydrodesulfurization and hydrodenitrogenation) of petroleum feedstocks (better than sulfided Mo/SiO$_2$ and Ni—Mo/SiO$_2$ currently used); useable as a material in modifying the physical properties of materials, corrosion resistant materials, wear-proof materials useable as a material in luminescent devices |
| $Cu_3P$: | usable as a negative electrode material, fine solder and as an important alloy addition |
| $Mn_2P$: | intercalates Li ion reversibly with low potential thus potentially being useful in fabricating Lithium batteries |
| FeP: | low bandgap semiconductor material with special magnetic properties. Nanowires prepared by thermal decomposition of $(\eta_4\text{-}C_6H_8)Fe(CO)_3$ |
| InP: | useable as a material in nanobarcodes, thin film transistors, light emitting diodes, high power and high speed electronics |
| GaP: | useable as a material to enhance scattering efficiency of visible light |
| MoP: | Hydroprocessing (Hydrodesulfurization and Hydrodenitrogenation) of organic compounds |

In yet another aspect, the present invention provides a general method of preparation of nanoparticles of metals and metal derivatives containing metals in Groups III, IV, V, VI, VII, VIII, IB, IIB, IIIA of the Periodic Table. From the description set forth above, it is evident that the chemistries involved in the synthetic procedures according to the various embodiments of the present invention would be expected to be similar to that occurring during metal phosphide synthesis at least to a certain degree.

In a further aspect, nickel phosphide nanoparticles that are synthesized according to various embodiments of the present invention either pristine, in a carbon composite or on a support such as a high surface area silica or alumina.

In yet another aspect, copper phosphide nanoparticles that are synthesized according to various embodiments of the present invention either pristine, in a carbon composite or on a support such as a high surface area silica or alumina.

Both nickel phosphide, and copper phosphide nanoparticles that are synthesized according to various embodiments of the present invention can be used as hydroprocessing catalysts. Note that the hydroprocessing of crude oil containing S and N is of paramount importance to the oil industry. Overall demand for petroleum refining catalysts is forecast to increase 2.8%/year, to $3.5 billion in 2010, according to a recent report by Ned Zimmerman, analyst at The Freedonia Group (Cleveland). Hydroprocessing catalysts has been predicted to be the fastest-growing refinery catalysts due to increasingly higher sulfur-content oil (from future petroleum crude as well as Canadian tar sands).

Thus, in sum, among other things, the present invention in one aspect provides a method or process from which carbon-metal nanocomposites can be prepared by a novel microwave-assisted technique that will have tremendous implications in the synthesis of advanced nanocomposites from biomass and other suitable carbon precursors. The process is simple yet on-obvious and occurs through a series of reactions initiated by a thermal runaway associated with the microwave absorption of the metal oxide, which in turn helps in the carbonization of lignin. The carbon formed reduces the metal oxide to a metal resulting in a carbon-metal composite. The method could be applied to a variety of different metals and is a powerful technique for generation of a plethora of carbon-metal nanocomposites from carbon-containing precursors. The resulted carbon-metal nanocomposites, carbon nanoparticles, and metal nanoparticles can find many applications.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

LIST OF REFERENCES

1. Carbon fibers from lignin-recyclable plastic blends by Satoshi Kubo and John F. Kadla in "Encyclopedia of Chemical Processing", Vol. 1, Ed. Sunggyu Lee, CRC Press pp. 317-332.
2. Low cost carbon fiber from renewable resources. Compere, A. L.; Griffith, W. L.; Leitten, C. F., Jr.; Shaffer, J. T. Oak Ridge National Laboratory, Oak Ridge, Tenn., USA. International SAMPE Technical Conference (2001), 33 1306-1314. Publisher: Society for the Advancement of Material and Process Engineering.
3. Frederick S. Baker "Activated carbon fibers and engineered forms from renewable resources" U.S. Patent US 2007/0142225 A1 (2007)
4. Antal, Michael Jerry, Jr.; Mochidzuki, Kazuhiro; Paredes, Lloyd S. Flash carbonization of biomass. Industrial & Engineering Chemistry Research (2003), 42(16), 3690-3699.
5. Kang, Zhenhui; Wang, Enbo; Mao, Baodong; Su, Zhongmin; Chen, Lei; Xu, Lin. Obtaining carbon nanotubes from grass. Nanotechnology (2005), 16(8), 1192-1195.
6. Zhang, Xinyu; Manohar, Sanjeev K. Microwave synthesis of nanocarbons from conducting polymers. Chemical Communications (Cambridge, United Kingdom) (2006), (23), 2477-2479.
7. Bao, Jianchun; Wang, Keyu; Xu, Zheng; Zhang, Hong; Lu, Zuhong. A novel nanostructure of nickel nanotubes encapsulated in carbon nanotubes. Chemical Communications (Cambridge, United Kingdom) (2003), (2), 208-209.
8. Chen, Wei Xiang; Lee, Jim Yang; Liu, Zhaolin. Microwave-assisted synthesis of carbon supported Pt nanoparticles for fuel cell applications. Chemical Communications (Cambridge, United Kingdom) (2002), (21), 2588-2589.
9. Meng, Qinghan; Liu, Ling; Song, Huaihe. Copper-doped mesoporous activated carbons as electrode material for electrochemical capacitors. Journal of Applied Electrochemistry (2006), 36(1), 63-67.
10. Oyama, S. Ted. Novel catalysts for advanced hydroprocessing: transition metal phosphides. Journal of Catalysis (2003), 216(1-2), 343-352.
11. Oyama, S. T.; Wang, X.; Requejo, F. G.; Sato, T.; Yoshimura, Y. Hydrodesulfurization of Petroleum Feedstocks with a New Type of Nonsulfide Hydrotreating Catalyst. Journal of Catalysis (2002), 209(1), 1-5.
12. Oyama, S. Ted; Lee, Yong-Kul. Mechanism of Hydrodenitrogenation on Phosphides and Sulfides. Journal of Physical Chemistry B (2005), 109(6), 2109-2119.
13. Liu, Shuling; Liu, Xinzheng; Xu, Liqiang; Qian, Yitai; Ma, Xicheng. Controlled synthesis and characterization of nickel phosphide nanocrystal. Journal of Crystal Growth (2007), 304(2), 430-434.
14. Xie, Songhai; Qiao, Minghua; Zhou, Wuzong; Luo, Ge; He, Heyong; Fan, Kangnian; Zhao, Tiejun; Yuan, Weikang. Controlled synthesis, characterization, and crystallization of Ni—P nanospheres. Journal of Physical Chemistry B (2005), 109(51), 24361-24368.
15. Wang, Xinjun; Han, Kun; Gao, Youjun; Wan, Fuquan; Jiang, Kai. Fabrication of novel copper phosphide ($Cu_3P$) hollow spheres by a simple solvothermal method. Journal of Crystal Growth (2007), 307(1), 126-130.
16. Vivas, N.; Bourqeois, G.; Vitry, C.; Glories, Y.; de Freitas, V., "Determination of the composition of commercial tannin extracts by liquid secondary ion mass spectrometry" J. Sci. Food Agric., 1996, 72, 309-317

What is claimed is:

1. A process for synthesizing carbon-metal nanocomposites, comprising:
    (a) preparing a metal derivative or a metal chelated derivative of a carbon-containing precursor in solid form; and
    (b) subjecting the metal derivative or metal chelated derivative of a carbon-containing precursor in solid form to microwave radiation at a frequency in the range of 900 MHz to 5.8 GHz, for a period of time effective to generate a heat flow from inside of the metal derivative or metal chelated derivative of a carbon-containing precursor in solid form to the outside such that the temperature of the metal derivative or metal chelated derivative of a carbon-containing precursor in solid form reaches 1,000° C. in less than 6 minutes with a temperature (T) derivative over time (t), $\Delta T/\Delta t$, no less than 2.5° C./second to form carbon-metal nanocomposites, wherein the process further comprises the step of performing an alkali treatment to the metal derivative or metal chelated derivative of a carbon-containing precursor prior to the subjecting step.

2. The process of claim 1, wherein the frequency of microwave radiation is at around 2.45 GHz, and the period of time effective is in a range of 30 seconds to 60 minutes.

3. The process of claim 1, wherein the metal of the metal derivative or metal chelated derivative is selected from the group consisting of Sb, Li, Rb, Ti, V, Mn, Fe, Co, Ni, Cu, Zn, Zr, Mo, Ru, Rh, Pd, Ag, W, Ir, Pt, Au and a combination thereof.

4. The process of claim 1, wherein the metal in the metal derivative or metal chelated derivative is selected from the group of Co, Cu, Mn, Ni, Fe, W, Zr and Ti.

5. The process of claim 1, wherein the carbon-containing precursor is selected from the group consisting of lignin, lignosulfonate, tannin, tanninsulfonate and sulfonated asphalt.

6. The process of claim 5, wherein the subjecting step is performed in the presence of a microwave absorber.

7. The process of claim 6, wherein the microwave absorber is selected from the group consisting of metal particles, phosphoric acid, hydrated $NaH_2PO_4$, $CO_2O_3$, CuO, $MnO_2$, NiO, $Fe_3O_4$, $WO_3$, $Ag_2O$, $Au_2O_3$, non-stoichiometric oxides of titanium ($TiO_{2-x}$) and a carbon allotrope.

8. The process of claim 7, wherein the carbon allotrope is selected from the group consisting of carbon black, fullerene, graphite and carbon nanotubes.

9. A process for synthesizing carbon-metal nanocomposites, comprising:
  (a) preparing an ammonium salt of a carbon-containing precursor and a metal salt in solid form; and
  (b) subjecting the ammonium salt of a carbon-containing precursor and the metal salt in solid form to microwave radiation at a frequency in the range of 900 MHz to 5.8 GHz, for a period of time effective to generate a heat flow from inside of the ammonium salt of a carbon-containing precursor and the metal salt in solid form to the outside such that the temperature of the ammonium salt of a carbon-containing precursor and the metal salt in solid form reaches 1,000° C. in about less than 6 minutes with a temperature (T) derivative over time (t), $\Delta T/\Delta t$, no less than 2.5° C./second to form carbon-metal nanocomposites.

10. The process of claim 9, wherein the frequency of microwave radiation is at around 2.45 GHz, and the period of time effective is in a range of 30 seconds to 60 minutes.

11. The process of claim 9, wherein the metal of the metal salt is selected from the group consisting of Sb, Li, Rb, Ti, V, Mn, Fe, Co, Ni, Cu, Zn, Zr, Mo, Ru, Rh, Pd, Ag, W, Ir, Pt, Au and a combination thereof.

12. The process of claim 9, wherein the metal salt is selected from the group consisting of an oxalate, an acetate, a sulfate and a chloride.

13. The process of claim 9, wherein the carbon-containing precursor is selected from the group consisting of ammonium lignosulfonate, ammonium tanninsulfonate and ammonium asphaltsulfonate.

14. The process of claim 9, wherein the subjecting step is performed in the presence of a microwave absorber.

15. The process of claim 14, wherein the microwave absorber is selected from the group consisting of metal particles, phosphoric acid, hydrated $NaH_2PO_4$, $CO_2O_3$, CuO, $MnO_2$, NiO, $Fe_3O_4$, $WO_3$, $Ag_2O$, $Au_2O_3$, non-stoichiometric oxides of titanium ($TiO_{2-x}$) and a carbon allotrope.

16. The process of claim 15, wherein the carbon allotrope is selected from the group consisting of carbon black, fullerene, graphite and carbon nanotubes.

17. A process for synthesizing carbon-metal nanocomposites, comprising:
  (a) preparing a carbon-containing precursor, wherein the carbon-containing precursor further comprises a dispersion of a metal salt; and
  (b) subjecting the carbon-containing precursor in the presence of a microwave absorber to microwave radiation at a frequency in the range of 900 MHz to 5.8 GHz, for a period of time effective to generate a heat flow from inside of the carbon-containing precursor to the outside such that the temperature of the carbon-containing precursor increases with a temperature (T) derivative over time (t), $\Delta T/\Delta t$, no less than 2.5° C./second to form carbon-metal nanocomposites,
  wherein the carbon-containing precursor is selected from the group consisting of lignin, an ammonium derivative of lignin, an alkali metal lignosulfonate, tannin, tanninsulfonate, asphalt, sulfonated asphalt, wood, sawdust, sucrose, lactose, cellulose, starch, polysaccharide, organic garbage, pitch derived from petroleum or coal, a carbon-containing polymer and their derivatives.

18. The process of claim 17, wherein the frequency of microwave radiation is at around 2.45 GHz, and the period of time effective is in a range of 30 seconds to 60 minutes.

19. The process of claim 17, wherein the microwave absorber is selected from the group consisting of metal particles, phosphoric acid, hydrated $NaH_2PO_4$, $CO_2O_3$, CuO, $MnO_2$, NiO, $Fe_3O_4$, $WO_3$, $Ag_2O$, $Au_2O_3$, non-stoichiometric oxides of titanium ($TiO_{2-x}$) and a carbon allotrope.

20. The process of claim 19, wherein the carbon allotrope is selected from the group consisting of carbon black, fullerene, graphite and carbon nanotubes.

21. The process of claim 17, wherein the carbon-containing polymer is selected from the group consisting of polyethylene glycol, polybenzimidazole, polybutadiene, polyethylene, polyvinyl alcohol, polyimides, polystyrene, rayon, polypropylene, nylon, phenol-formaldehyde resin and naphthalenesulfonic acid-formaldehyde copolymer.

22. The process of claim 17, wherein the metal of the metal salt is selected from the group consisting of Sb, Li, Rb, Ti, V, Mn, Fe, Co, Ni, Cu, Zn, Zr, Mo, Ru, Rh, Pd, Ag, W, Ir, Pt, Au and a combination thereof.

23. The process of claim 17, further comprising the step of performing an alkali treatment to the metal salt prior to the subjecting step.

24. A process for synthesizing carbon-metal nanocomposites, comprising:
  (a) preparing a sample of metal ions and an organic compound; and
  (b) subjecting the sample to microwave radiation at a frequency in the range of 900 MHz to 5.8 GHz, for a period of time effective to generate a heat flow from inside of the sample to the outside such that the temperature of the sample increases with a temperature (T) derivative over time (t), $\Delta T/\Delta t$, no less than 2.5° C./second for at least several minutes to form carbon-metal nanocomposites.

25. The process of claim 24, wherein the frequency of microwave radiation is at around 2.45 GHz, and the period of time effective is in a range of 30 seconds to 60 minutes.

26. The process of claim 24, wherein the organic compound comprises one of cellulose, hydroxyalkylcellulose, cyclodextrins, chitin, chitosan, starch; guar gum and polysaccharides.

27. The process of claim 26, wherein the hydroxyalkylcellulose comprises hydroxyethylcellulose, methylcellulose, and carboxymethylcellulose.

28. The process of claim 24, wherein the metal ions comprises at least one of metals in Groups III, IV, V, VI, VII, VIII, IB, IIB, IIIA of the Periodic Table.

* * * * *